US011647450B2

(12) United States Patent
Kneckt et al.

(10) Patent No.: US 11,647,450 B2
(45) Date of Patent: May 9, 2023

(54) MULTI-LINK BEACONING AND DISCOVERY

(71) Applicant: Apple Inc., Cupertino, CA (US)

(72) Inventors: Jarkko L. Kneckt, Los Gatos, CA (US); Jinjing Jiang, San Jose, CA (US); Lochan Verma, San Diego, CA (US); Qi Wang, Sunnyvale, CA (US); Su Khiong Yong, Palo Alto, CA (US); Tianyu Wu, Fremont, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 17/334,456

(22) Filed: May 28, 2021

(65) Prior Publication Data

US 2021/0392571 A1    Dec. 16, 2021

Related U.S. Application Data

(60) Provisional application No. 63/031,666, filed on May 29, 2020.

(51) Int. Cl.
*H04W 4/00* (2018.01)
*H04W 48/16* (2009.01)
*H04W 48/10* (2009.01)
*H04W 84/12* (2009.01)

(52) U.S. Cl.
CPC .......... *H04W 48/16* (2013.01); *H04W 48/10* (2013.01); *H04W 84/12* (2013.01)

(58) Field of Classification Search
CPC .............................. H04W 48/10; H04W 48/16
USPC ........................................................... 455/434
See application file for complete search history.

(56) References Cited

U.S. PATENT DOCUMENTS

| | | | |
|---|---|---|---|
| 2015/0350974 A1* | 12/2015 | Patil ................ | H04W 36/00835 370/331 |
| 2018/0242216 A1 | 8/2018 | Backes et al. | |
| 2019/0098493 A1* | 3/2019 | Li ....................... | H04W 12/009 |
| 2021/0274378 A1 | 9/2021 | Chen et al. | |

FOREIGN PATENT DOCUMENTS

WO        2005039133 A1    4/2005

* cited by examiner

*Primary Examiner* — Temica M Beamer
(74) *Attorney, Agent, or Firm* — Kowert, Hood, Munyon, Rankin & Goetzel, P.C.

(57) ABSTRACT

An electronic device may transmit beacons associated with multiple access points that are cohosted by the electronic device, and that provide concurrent links in different bands of frequencies. The electronic device may include an access-point multi-link device (AP MLD). Moreover, the beacons may include: a basic service set identifier (BSSID) associated with the access points in the AP MLD, a service set identifier (SSID) associated with the access points in the AP MLD, and a MLD media access control (MAC) address associated with the access points in the AP MLD. Furthermore, a given beacon may be associated with a given access point and may include: information specifying a channel of a given link, a reduced neighbor report (RNR) providing information about at least the access points in the AP MLD, and a field that indicates when the given access point is included in the AP MLD.

20 Claims, 14 Drawing Sheets

MULTI-LINK BEACONING AND DISCOVERY

CROSS-REFERENCE TO RELATED APPLICATION

This application claims the benefit of U.S. Provisional Application No. 63/031,666, entitled "Multi-Link Beaconing and Discovery," by Jarkko Kneckt, et al., filed May 29, 2020, the contents of which are hereby incorporated by reference.

FIELD

The described embodiments relate, generally, to wireless communications among electronic devices, including techniques for communicating information associated with multiple concurrent links between electronic devices.

BACKGROUND

Many electronic devices communicate with each other using wireless local area networks (WLANs), such as those based on a communication protocol that is compatible with an Institute of Electrical and Electronics Engineers (IEEE) standard, such as an IEEE 802.11 standard (which is sometimes referred to as 'Wi-Fi').

IEEE 802.11be has proposed the use of multiple concurrent links between electronic devices, such as an access point and an associated client or station. These concurrent links may be in different bands of frequencies, such as 2.4, 5 and/or 6 GHz bands of frequencies. However, the proposed use of multiple links raises challenges with link discovery and setup or configuration.

SUMMARY

In a first group of embodiments, an electronic device that transmits beacons associated with multiple access points is described. This electronic device may include: an antenna node (or a pad or a connector) that is communicatively coupled to an antenna; and one or more interface circuits communicatively coupled to the antenna node. During operation, the one or more interface circuits may transmit, to the antenna node, the beacons associated with the multiple access points, which are cohosted by the electronic device, and that provide concurrent links in different bands of frequencies, where the electronic device include an access-point multi-link device (AP MLD). Moreover, the beacons include: a first service set identifier (SSID) associated with the access points in the AP MLD, and a first MLD media access control (MAC) address associated with the access points in the AP MLD. Furthermore, a given beacon is associated with a given access point and includes: information specifying a channel of a given link, a reduced neighbor report (RNR) providing information about at least the access points in the AP MLD, and a field that indicates when the given access point is included in the AP MLD.

Note that the electronic device may include an access point.

Moreover, the electronic device may be compatible with an IEEE 802.11be standard.

Furthermore, the RNR may include information about an additional access point cohosted by the electronic device, and the additional access point may not be included in the AP MLD and may have a second SSID and a second MAC address different from the first SSID and the first MLD MAC address.

Additionally, the one or more interface circuits may associate with a recipient electronic device based at least in part on the information included in the given beacon.

In some embodiments, a basic service set identifier (BSSID) in the given beacon is derived from the first MLD MAC address. For example, the BSSID in the given beacon may include the first MLD MAC address and a link-specific portion specifying a link identifier.

Note that the field may be one byte in length.

Other embodiments provide an integrated circuit (which is sometimes referred to as a 'communication circuit') for use with the electronic device. The integrated circuit may perform at least some of the aforementioned operations.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for transmitting beacons associated with multiple access points. The method includes at least some of the aforementioned operations performed by the electronic device.

Other embodiments provide a recipient electronic device that receives beacons associated with multiple access points. This recipient electronic device may include: an antenna node (or a pad or a connector) that is communicatively coupled to an antenna; and one or more interface circuits, communicatively coupled to the antenna node, that communicates with an electronic device. During operation, the one or more interface circuits may receive, from the antenna node, the beacons associated with the multiple access points, which are cohosted by the electronic device, and that provide concurrent links in different bands of frequencies, where the electronic device includes an AP MLD. Moreover, the beacons include: a first SSID associated with the access points in the AP MLD, and a first MLD MAC address associated with the access points in the AP MLD. Furthermore, a given beacon is associated with a given access point and includes: information specifying a channel of a given link, an RNR providing information about at least the access points in the AP MLD, and a field that indicates when the given access point is included in the AP MLD.

Moreover, the one or more interface circuits may associate with the electronic device based at least in part on the information included in the given beacon before all of the beacons are received.

Other embodiments provide an integrated circuit (which is sometimes referred to as a 'communication circuit') for use with the recipient electronic device. The integrated circuit may perform at least some of the aforementioned operations.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for receiving beacons associated with multiple access points. The method includes at least some of the aforementioned operations performed by the electronic device.

In a second group of embodiments, an electronic device that transmits beacons associated with multiple access points is described. This electronic device may include: an antenna node (or a pad or a connector) that is communicatively coupled to an antenna; and one or more interface circuits communicatively coupled to the antenna node. During operation, the one or more interface circuits may transmit, to the antenna node, the beacons associated with the multiple access points, which are cohosted by the electronic device, and that provide concurrent links in different bands of frequencies, where the electronic device includes an AP MLD. Moreover, a given beacon is associated with a given access point and includes a check beacon field that indicates when there is a new parameter or a change in a parameter associated with a link in the links in a band of frequencies.

Note that the link may be provided by the given access point.

Moreover, the link may be provided in a same band of frequencies as the given beacon.

Furthermore, the link may be provided by a different access point than the given access point.

Additionally, the link may be provided in a different band of frequencies as the given beacon.

In some embodiments, the electronic device may include an access point.

Moreover, the electronic device may be compatible with an IEEE 802.11be standard.

Furthermore, the one or more interface circuits may: receive, from the antenna node, a query associated with a recipient electronic device for information about the change in the parameter; and, in response to the query, transmit, to the antenna node, a response addressed to the recipient electronic device with the information about the change in the parameter. This query may be received and the response may be transmitted after the recipient electronic device associates with at least one of the access points in the AP MLD. Additionally, the query and the response may be encrypted. In some embodiments. the query and the response are: encrypted using a pre-association security negotiation (PASN) authentication key prior to association between the recipient electronic device and at least the one of the access points; and/or are communicated using protected management frames (PMFs) after the association between the recipient electronic device and at least the one of the access points.

Note that the one or more interface circuits may scan a subset of the links, which excludes the link, to obtain the changed parameter.

Moreover, the given beacon may include an RNR providing information about at least the access points in the AP MLD.

Other embodiments provide an integrated circuit (which is sometimes referred to as a 'communication circuit') for use with the electronic device. The integrated circuit may perform at least some of the aforementioned operations.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for transmitting beacons associated with multiple access points. The method includes at least some of the aforementioned operations performed by the electronic device.

Other embodiments provide a recipient electronic device that receives beacons associated with multiple access points. This recipient electronic device may include: an antenna node (or a pad or a connector) that is communicatively coupled to an antenna; and one or more interface circuits, communicatively coupled to the antenna node, that communicates with an electronic device. During operation, the one or more interface circuits may receive, from the antenna node, the beacons associated with the multiple access points, which are cohosted by the electronic device, and that provide concurrent links in different bands of frequencies, where the electronic device includes an AP MLD. Moreover, a given beacon is associated with a given access point and includes a check beacon field that indicates when there is a new parameter or a change in a parameter associated with a link in the links in a band of frequencies.

Note that the one or more interface circuits may: transmit, to the antenna node, a query addressed to the electronic device for information about the change in the parameter; and receive, from the antenna node, a response associated with the electronic device with the information about the change in the parameter. The query may be received and the response may be transmitted after the recipient electronic device associates with at least one of the access points in the AP MLD. Moreover, the query and the response may be encrypted. In some embodiments, the query and the response may be: encrypted using a PASN authentication key prior to association between the recipient electronic device and at least the one of the access points in the AP MLD; and/or communicated using PMFs after the association between the recipient electronic device and at least the one of the access points in the AP MLD.

Moreover, the one or more interface circuits may scan a subset of the links, which excludes the link, to obtain the changed parameter.

Other embodiments provide an integrated circuit (which is sometimes referred to as a 'communication circuit') for use with the recipient electronic device. The integrated circuit may perform at least some of the aforementioned operations.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for receiving beacons associated with multiple access points. The method includes at least some of the aforementioned operations performed by the electronic device.

In a third group of embodiments, a recipient electronic device that receives beacons associated with multiple access points is described. This recipient electronic device may include: an antenna node (or a pad or a connector) that is communicatively coupled to an antenna; and one or more interface circuits, communicatively coupled to the antenna node, that communicates with an electronic device. During operation, the one or more interface circuits may receive, from the antenna node, the beacons associated with the multiple access points, which are cohosted by the electronic device, and that provide concurrent links in different bands of frequencies, where the electronic device includes an AP MLD. Moreover, a given beacon is associated with a given access point and a first link in the links in a band of frequencies. Then, the one or more interface circuits may perform an operation to maintain a second link in the links in a different band of frequencies than the first link using information included in the given beacon.

Note that the first link may be provided in a same band of frequencies as the given beacon.

Moreover, the first link may be provided in a different band of frequencies from the given beacon.

Furthermore, the operation may be included in a first set of operations when the first link is provided in a same band of frequencies as the given beacon. Alternatively, the operation may be included in a second set of operations when the first link is provided in a different band of frequencies from the given beacon. Additionally, the first set of operations may be at least partially different from the second set of operations.

In some embodiments, the operation may be included in a set of operations that includes: time synchronization, determining availability of one of the access points, determining an assessment of the first link, or determining a congestion level of the one of the access points.

Other embodiments provide an integrated circuit (which is sometimes referred to as a 'communication circuit') for use with the recipient electronic device. The integrated circuit may perform at least some of the aforementioned operations.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for receiving beacons associated with multiple access points. The method includes at least some of the aforementioned operations performed by the electronic device.

In a fourth group of embodiments, an electronic device that transmits beacons associated with multiple access points is described. This electronic device may include: an antenna node (or a pad or a connector) that is communicatively coupled to an antenna; and one or more interface circuits communicatively coupled to the antenna node. During operation, the one or more interface circuits may transmit, to the antenna node, the beacons associated with the multiple access points, which are cohosted by the electronic device, and that provide concurrent links in different bands of frequencies, where subsets of the access points in the different bands of frequencies include a first AP MLD and a second AP MLD. Moreover, for a first access point in the first AP MLD in a band of frequencies in the bands of frequencies and a second access point in the second AP MLD in the band of frequencies, a beacon in the beacons includes a multi-BSSID beacon. Furthermore, the multi-BSSID beacon includes a transmitted BSSID of the first access point and link-specific operational parameters of the first access point, and a non-transmitted BSSID of the second access point and relative differences in link-specific operational parameters of the second access point.

Note that the second access point may include a virtual access point.

Moreover, the multi-BSSID may include an MLD element of the first access point.

Furthermore, the multi-BSSID may include relative differences in an MLD element of the second access point.

Additionally, the multi-BSSID may include an RNR providing information about at least access points in the first AP MLD and the second AP MLD.

Other embodiments provide an integrated circuit (which is sometimes referred to as a 'communication circuit') for use with the electronic device. The integrated circuit may perform at least some of the aforementioned operations.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for transmitting beacons associated with multiple access points. The method includes at least some of the aforementioned operations performed by the electronic device.

Other embodiments provide a recipient electronic device that receives beacons associated with multiple access points. This recipient electronic device may include: an antenna node (or a pad or a connector) that is communicatively coupled to an antenna; and one or more interface circuits, communicatively coupled to the antenna node, that communicates with an electronic device. During operation, the one or more interface circuits may receive, from the antenna node, the beacons associated with the multiple access points, which are cohosted by the electronic device, and that provide concurrent links in different bands of frequencies, where subsets of the access points in the different bands of frequencies include a first AP MLD and a second AP MLD. Moreover, for a first access point in the first AP MLD in a band of frequencies in the bands of frequencies and a second access point in the second AP MLD in the band of frequencies, a beacon in the beacons includes a multi-BSSID beacon. Furthermore, the multi-BSSID beacon includes a transmitted BSSID of the first access point and link-specific operational parameters of the first access point, and a non-transmitted BSSID of the second access point and relative differences in link-specific operational parameters of the second access point.

Other embodiments provide an integrated circuit (which is sometimes referred to as a 'communication circuit') for use with the recipient electronic device. The integrated circuit may perform at least some of the aforementioned operations.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for receiving beacons associated with multiple access points. The method includes at least some of the aforementioned operations performed by the electronic device.

In a fifth group of embodiments, an electronic device that transmits beacons associated with multiple access points is described. This electronic device may include: an antenna node (or a pad or a connector) that is communicatively coupled to an antenna; and one or more interface circuits communicatively coupled to the antenna node. During operation, the one or more interface circuits may transmit, to the antenna node, the beacons associated with the multiple access points, which are cohosted by the electronic device, and that provide concurrent links in different bands of frequencies, where subsets of the access points in the different bands of frequencies include a first AP MLD and a second AP MLD. Moreover, for a first access point in the first AP MLD in a band of frequencies in the bands of frequencies and a second access point in the second AP MLD in the band of frequencies, a beacon in the beacons includes a multi-BSSID beacon. Furthermore, the multi-BSSID beacon includes a transmitted BSSID of the first access point, link-specific operational parameters of the first access point, a first MLD element of the first access point, and a second MLD element of the second access point.

Note that the second access point may include a virtual access point.

Moreover, the multi-BSSID may include an RNR providing information about at least access points in the first AP MLD and the second AP MLD.

Other embodiments provide an integrated circuit (which is sometimes referred to as a 'communication circuit') for use with the electronic device. The integrated circuit may perform at least some of the aforementioned operations.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for transmitting beacons associated with multiple access points. The method includes at least some of the aforementioned operations performed by the electronic device.

Other embodiments provide a recipient electronic device that receives beacons associated with multiple access points. This recipient electronic device may include: an antenna node (or a pad or a connector) that is communicatively coupled to an antenna; and one or more interface circuits, communicatively coupled to the antenna node, that communicates with an electronic device. During operation, the one or more interface circuits may receive, from the antenna node, the beacons associated with the multiple access points, which are cohosted by the electronic device, and that provide concurrent links in different bands of frequencies, where subsets of the access points in the different bands of frequencies include a first AP MLD and a second AP MLD. Moreover, for a first access point in the first AP MLD in a band of frequencies in the bands of frequencies and a second access point in the second AP MLD in the band of frequencies, a beacon in the beacons includes a multi-BSSID beacon. Furthermore, the multi-BSSID beacon includes a transmitted BSSID of the first access point, link-specific operational parameters of the first access point, a first MLD element of the first access point, and a second MLD element of the second access point.

Other embodiments provide an integrated circuit (which is sometimes referred to as a 'communication circuit') for use with the recipient electronic device. The integrated circuit may perform at least some of the aforementioned operations.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for receiving beacons associated with multiple access points. The method includes at least some of the aforementioned operations performed by the electronic device.

In a sixth group of embodiments, an electronic device that transmits beacons associated with multiple access points is described. This electronic device may include: an antenna node (or a pad or a connector) that is communicatively coupled to an antenna; and one or more interface circuits, communicatively coupled to the antenna node, that communicates with a recipient electronic device. During operation, the one or more interface circuits may transmit, to the antenna node, the beacons associated with the multiple access points, which are cohosted by the electronic device, and that provide concurrent links in different bands of frequencies, where the access points in the different bands of frequencies include an AP MLD. Moreover, the one or more interface circuits may perform authentication with the recipient electronic device to determine an encryption key, where the authentication is performed in a band of frequencies associated with one of the access points prior to association between the recipient electronic device and at least the one of the access points.

Note that the encryption key may be used to encrypt communication between the recipient electronic device and the one of the access points. For example, the encryption key may be determined using PASN authentication. In some embodiments, the PASN authentication occurs in the band of frequencies associated with the one of the access points.

Moreover, the encryption key may be used to encrypt communication between the recipient electronic device and the access points. This communication may use a first MAC address for the access points. Alternatively or additionally, the communication may use link-specific MAC addresses for the access points.

Furthermore, the one or more interface circuits may: receive, from the antenna node, a query associated with the recipient electronic device for information associated with one or more of the access points or links; and, in response to the query, provide, to the antenna node, a response with the information addressed to the recipient electronic device. Note that the query and the response may be encrypted using the encryption key. Additionally, the query and the response may be communicated in the band of frequencies. In some embodiments, the query may include a generic advertisement service (GAS) request and the response includes a GAS response. Note that the information may include communication performance of the one or more of the access points or the links. Moreover, the one or more interface circuits may associate with the recipient electronic device based at least in part on the information, and the communication during the association may be encrypted using the encryption key.

In some embodiments, the one or more interface circuits may associate with the recipient electronic device, and the communication during the association may be encrypted using the encryption key. Moreover, the one or more interface circuits may communicate with the recipient electronic device using PMFs after the association with the recipient electronic device.

Other embodiments provide an integrated circuit (which is sometimes referred to as a 'communication circuit') for use with the electronic device. The integrated circuit may perform at least some of the aforementioned operations.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for transmitting beacons associated with multiple access points. The method includes at least some of the aforementioned operations performed by the electronic device.

Other embodiments provide a recipient electronic device that receives beacons associated with multiple access points. This recipient electronic device may include: an antenna node (or a pad or a connector) that is communicatively coupled to an antenna; and one or more interface circuits, communicatively coupled to the antenna node, that communicates with an electronic device. During operation, the one or more interface circuits may receive, from the antenna node, the beacons associated with multiple access points, which are cohosted by the electronic device, and that provide concurrent links in different bands of frequencies, where the access points in the different bands of frequencies includes an AP MLD. Moreover, the one or more interface circuits may perform authentication with the electronic device to determine an encryption key, where the authentication is performed in a band of frequencies associated with one of the access points prior to association between the recipient electronic device and at least the one of the access points.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
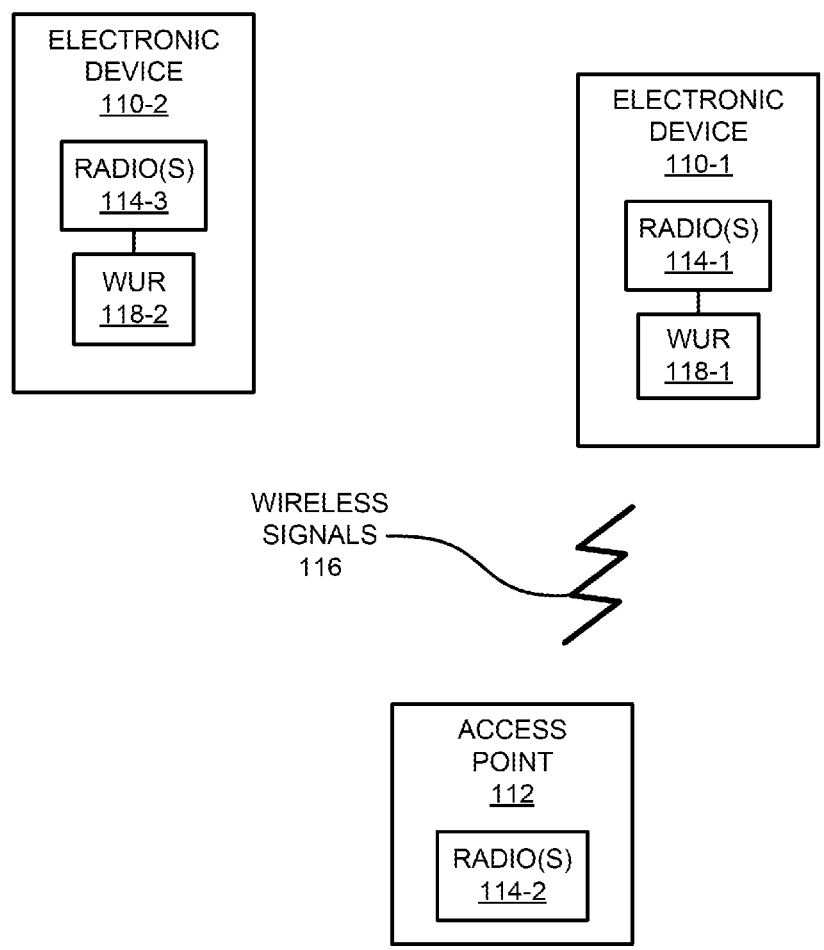
FIG. 1 is a block diagram illustrating an example of communication between electronic devices.

An electronic device (such as an access point) that transmits beacons associated with multiple access points is described. This electronic device may include: an antenna node (or a pad or a connector) that is communicatively coupled to an antenna; and one or more interface circuits communicatively coupled to the antenna node. During operation, the one or more interface circuits may transmit, to the antenna node, the beacons associated with the multiple access points, which are cohosted by the electronic device, and that provide concurrent links in different bands of frequencies, where the electronic device includes an AP MLD. Moreover, the beacons include: a first SSID associated with the access points in the AP MLD, and a first MLD MAC address associated with the access points in the AP MLD. Furthermore, a given beacon is associated with a given access point and includes: information specifying a channel of a given link, an RNR providing information about at least the access points in the AP MLD, and a field that indicates when the given access point is included in the AP MLD.

Moreover, a recipient electronic device (such as a cellular telephone, a computer, a wearable electronic device, or a portable electronic device) that receives the beacons associated with the multiple access points is described. This recipient electronic device may include: an antenna node (or a pad or a connector) that is communicatively coupled to an antenna; and one or more interface circuits, communicatively coupled to the antenna node, that communicates with an electronic device. During operation, the one or more interface circuits may receive, from the antenna node, the beacons associated with the multiple access points, which are cohosted by the electronic device, and that provide concurrent links in different bands of frequencies, where the electronic device includes an AP MLD. Moreover, the beacons include: a first SSID associated with the access points in the AP MLD, and a first MLD MAC address associated with the access points in the AP MLD. Furthermore, a given beacon is associated with a given access point and includes: information specifying a channel of a given link, an RNR providing information about at least the access points in the AP MLD, and a field that indicates when the given access point is included in the AP MLD.

By providing the beacons associated with the multiple access points, these communication techniques may facilitate the use of an AP MLD. These capabilities may improve the efficiency of spectrum usage and/or the communication performance when communicating in a WLAN using the electronic device and/or recipient electronic device(s). For example, the communication techniques may simplify and improve discovery operations, connection setup and/or configuration. Moreover, the communication techniques may allow the recipient electronic device(s) to efficiently obtain parameters associated with the access points in the AP MLD. Consequently, the communication techniques may improve the user experience and customer satisfaction.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11be, which is used as an illustrative example in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have one or more connections with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 15:
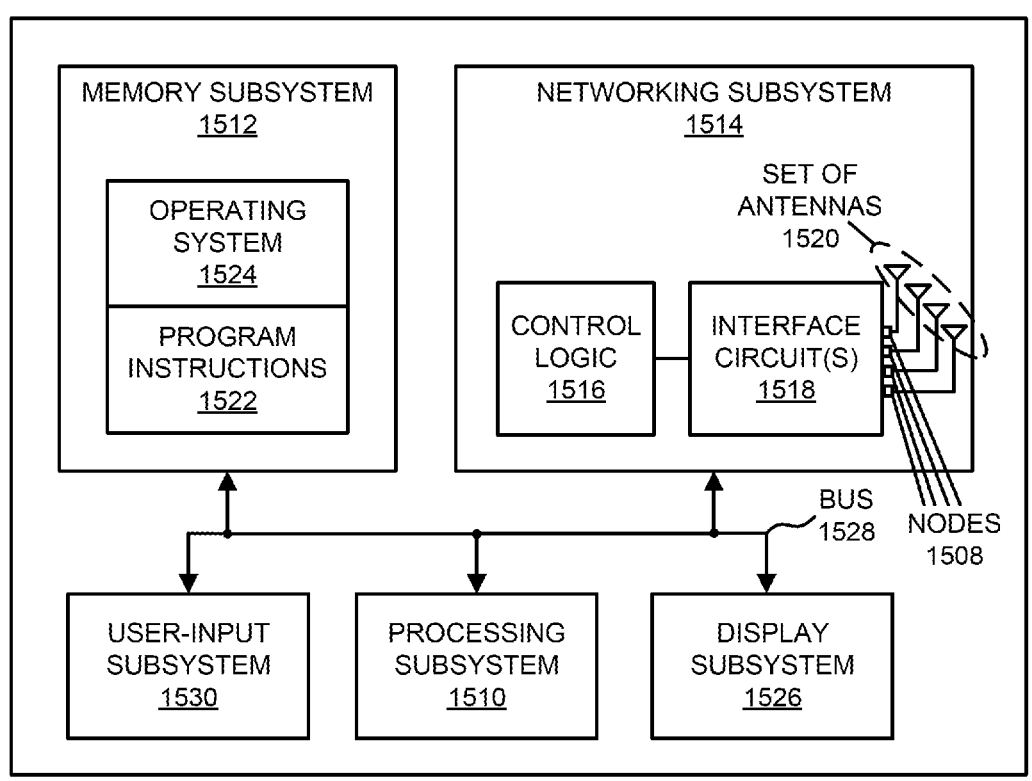
FIG. 15 is a block diagram illustrating an example of an electronic device of FIG. 1 or 2.

As described further below with reference to FIG. 15, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-12, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via one or more links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

Figure 2:
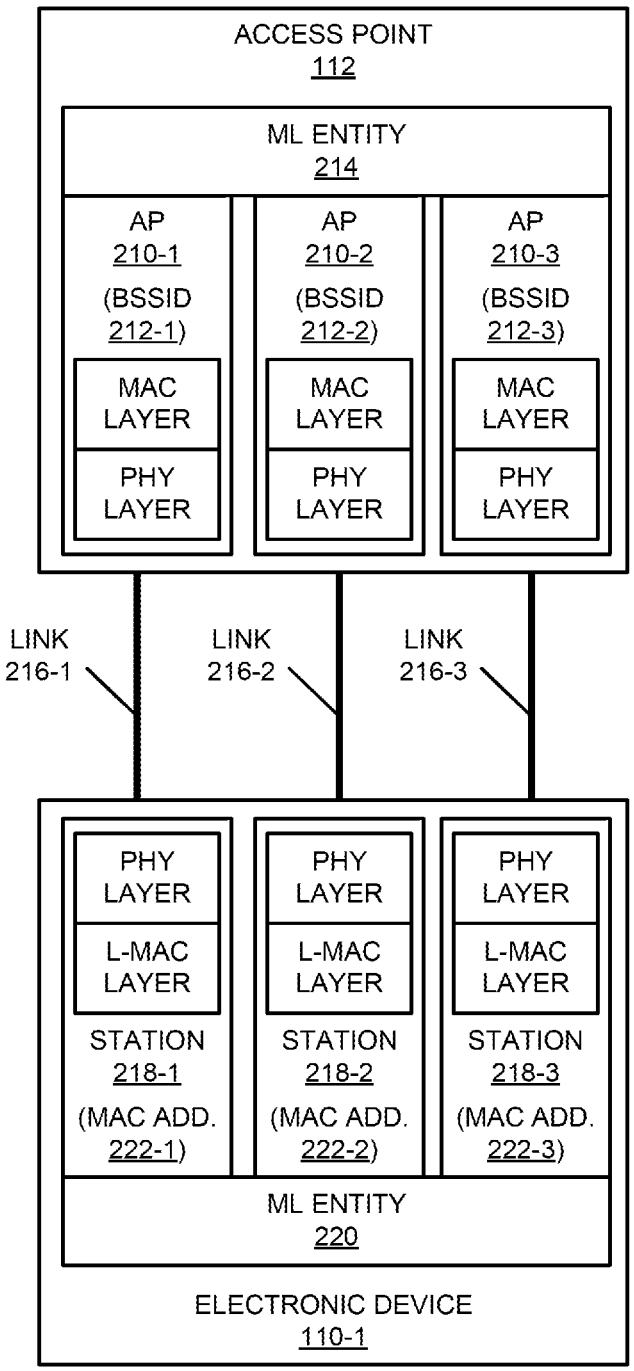
FIG. 2 is a block diagram illustrating an example of communication between electronic devices.

As discussed previously, IEEE 802.11be has proposed the use of multiple concurrent links between electronic devices, such as access point 112 and one or more of electronic device 110. For example, as shown in FIG. 2, which presents a block diagram illustrating an example of electronic devices communicating wirelessly, access point 112 may be an AP MLD that includes multiple access points (APs) 210, which are collocated in access point 112. Access points 210 may have associated BSSIDs 212, and MAC and physical (PHY) layers (including separate radios, which may be included in the same or different integrated circuits). Note that access point 112 may have a multi-link (ML) entity 214 having an MLD MAC address, an SSID, and that may provide security for access points 210.

Moreover, access points 210 may have different concurrent links 216 in different bands of frequencies (such as a link 216-1 in a 2.4 GHz band of frequencies, a link 216-2 in a 5 GHz band of frequencies and a link 216-3 in a 6 GHz bands of frequencies) with stations 218 in at least electronic device 110-1, which is a non-AP MLD. These stations may have associated lower MAC and physical (PHY) layers (including separate radios, which may be included in the same or different integrated circuits). In addition, electronic device 110-1 may have a ML entity 220 having an MLD MAC address.

For example, the AP MLD may have three radios. One radio may operate on a 2.4 GHz band of frequencies, and the other radios may operate on the 5/6 GHz bands of frequencies. The AP MLD may create three access points 210, operating on a 2.4 GHz channel, a 5 GHz channel, and a 6 GHz channel respectively. The three access points 210 may operate independently, each of which has at least one BSS with different BSSIDs 212. Moreover, each of the access points 210 may accommodate both legacy non-access point stations as well as non-AP MLD stations 218. Furthermore, each of access points 210 may transmit its own beacons using its own BSSID. Additionally, the AP MLD may have ML entity 214, identified by an MLD address (such as an MLD MAC address). This MAC address may be used to pair with ML entity 220 of the associated non-AP MLD stations 218.

Moreover, the non-AP MLD station (i.e., electronic device 110-1) may have two or three radios. One radio may operate on a 2.4 GHz band of frequencies, and the other radios may operate on the 5/6 GHz bands of frequencies. When the non-AP MLD establishes a ML association with the AP MLD, it may create up to three stations 218, each of which associates to one of access points 210 within the AP MLD. Each of stations 218 may have a different over-the-air MAC address 222. The non-AP MLD may also have ML entity 220, identified by another MLD address (such as another MLD MAC address). This MLD MAC address may be used to pair with ML entity 214 of the associated AP MLD.

However, the use of multiple links 216 raises challenges with link discovery and setup or configuration. In order to address these challenges, as described below with reference to FIGS. 2-13, in some embodiments of the disclosed communication techniques access point 112 may provide or transmit beacons associated with multiple access points 210. The beacons may include a first SSID of access points 210 (such as the SSID of access point 112), and a first MLD MAC address of access points 210 (such as the MLD MAC address of access point 112). Moreover, a given beacon may be associated with a given access point and may include: information specifying a channel of a given link, an RNR providing information about at least access points 210, and a field (which may be one byte in length) that indicates when the given access point is included in the AP MLD.

Note that the RNR may include information about an additional access point cohosted by access point 112, and the additional access point may not be included in the AP MLD and may have a second SSID and a second MAC address different from the first SSID and the first MLD MAC address. In some embodiments, a BSSID (such as BSSID 212-1) in the given beacon is derived from the first MLD MAC address. For example, the BSSID in the given beacon may include the first MLD MAC address and a link-specific portion specifying a link identifier.

Moreover, access point 112 (such as a given access point, e.g., access point 210-1) and electronic device 110-1 (such as a given station, e.g., station 218-1) may associate based at least in part on the information included in the given beacon. However, electronic device 110-1 may associate with access point 112 based at least in part on the information included in the given beacon before all of the beacons are received.

Furthermore, the given beacon may include a check beacon field that indicates when there is a new parameter or a change in a parameter associated with a link (such as link 216-1) in a band of frequencies. The link may be provided in a same or a different band of frequencies as the given beacon. In some embodiments, the link may be provided by a different access point in access points 210 than the given access point associated with the given beacon.

Note that one of access points 210 and/or one of stations 218 may scan a subset of the links, which excludes the link, to obtain the changed parameter. Alternatively or additionally, in response to the given beacon, electronic device 110-1 may transmit a query for information about the change in the parameter to access point 112, which is received by electronic device 110-1. Then, access point 112 may transmit a response to electronic device 110-1 with the information about the change in the parameter, which is received by access point 112. This query and the response may be transmitted after electronic device 110-1 associates with one of access points 210. Additionally, the query and the response may be encrypted. In some embodiments. the query and the response are: encrypted using a PASN authentication key prior to association between electronic device 110-1 and at least one of access points 210; and/or are communicated using PMFs after the association between electronic device 110-1 and at least the one of access points 210.

Moreover, the given beacon may be associated with a first link (such as link 216-1) in links 216 in a band of frequencies. In response, electronic device 110-1 (such as one of stations 218) may perform an operation to maintain a second link (such as link 216-2) in links 216 in a different band of frequencies than the first link using information included in the given beacon. Note that the first link may be provided in a same of a different band of frequencies as the given beacon. For example, the operation may be included in a first set of operations when the first link is provided in a same band of frequencies as the given beacon. Alternatively, the operation may be included in a second set of operations when the first link is provided in a different band of frequencies from the given beacon. Additionally, the first set of operations may be at least partially different from the second set of operations. In some embodiments, the operation may be included in a set of operations that includes: time synchronization, determining availability of one of access points 210, determining an assessment of the first link, or determining a congestion level of the one of access points 210.

Furthermore, subsets of access points 210 in the different bands of frequencies may include a first AP MLD and a second AP MLD. Moreover, for a first access point in the first AP MLD in a band of frequencies in the bands of frequencies and a second access point in the second AP MLD in the band of frequencies, a beacon in the beacons may include a multi-BSSID beacon. Furthermore, the multi-BSSID beacon may include a transmitted BSSID of the first access point and link-specific operational parameters of the first access point, and a non-transmitted BSSID of the second access point and relative differences in link-specific operational parameters of the second access point. Alternatively or additionally, the multi-BSSID beacon may include a transmitted BSSID of the first access point, link-specific operational parameters of the first access point, a first MLD element of the first access point, and a second MLD element of the second access point.

Note that the second access point may include a virtual access point. Moreover, the multi-BSSID may include an MLD element of the first access point. Furthermore, the multi-BSSID may include relative differences in an MLD element of the second access point. Additionally, the multi-BSSID may include an RNR providing information about at least access points in the first AP MLD and the second AP MLD.

Additionally, access point 112 may perform authentication with electronic device 110-1 to determine an encryption key, where the authentication is performed in a band of frequencies associated with one of access points 210 prior to association between electronic device 110-1 and at least the one of access points 210.

Note that the encryption key may be used to encrypt communication between electronic device 110-1 and the one of access points 210. For example, the encryption key may be determined using PASN authentication. In some embodiments, the PASN authentication occurs in the band of frequencies associated with the one of access points 210.

Moreover, the encryption key may be used to encrypt communication between electronic device 110-1 and access points 210. This communication may use the first MAC address for access points 210. Alternatively or additionally, the communication may use the link-specific MAC addresses for access points 210.

Furthermore, electronic device 110-1 may transmit, a query to access point 112 for information associated with one or more of access points 210 or links 216, which may be received by access point 112. In response to the query, access point 112 may transmit a response to electronic device 110-1 with the information. Note that the query and the response may be encrypted using the encryption key. Additionally, the query and the response may be communicated in the band of frequencies. In some embodiments, the query may include a GAS request and the response may include a GAS response. The information may include communication performance of the one or more of access points 210 or links 216. Moreover, access point 112 may associate with electronic device 110-1 based at least in part on the information, and the communication during the association may be encrypted using the encryption key. Furthermore, access point 112 may communicate with electronic device 110-1 using PMFs after the association with electronic device 110-1.

In summary, the communication techniques may be used to facilitate the use of an AP MLD. These capabilities may improve the efficiency of spectrum usage and/or the communication performance when communicating in a WLAN using access point 112 and electronic device 110-1.

Referring back to FIG. 1, note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as OFDMA). For example, the one or more radios 114-2 may provide one or more trigger frames for the one or more electronic devices. Moreover, in response to receiving the one or more trigger frames, the one or more radios 114-1 may provide one or more group or block acknowledgments to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110. Consequently, one of electronic devices 110 may perform operations in the communication techniques.

Figure 3:
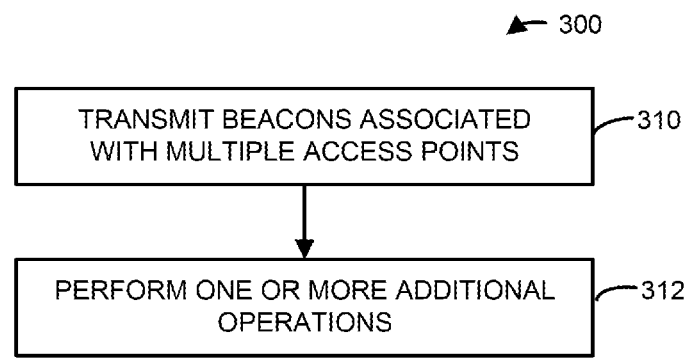
FIG. 3 is a flow diagram illustrating an example method for transmitting beacons associated with multiple access points using an electronic device of FIG. 2.

FIG. 3 presents a flow diagram illustrating an example method 300 for transmitting beacons associated with multiple access points. This method may be performed by an electronic device, such as access point 112 in FIG. 1. Note that the communication with a recipient electronic device may be compatible with an IEEE 802.11 communication protocol.

During operation, the electronic device may transmit the beacons associated with the multiple access points (operation 310), which are cohosted by the electronic device, and that provide concurrent links in different bands of frequencies, where the access points include or are included in an AP MLD. The beacons may include a first SSID associated with the access points, and a first MLD MAC address associated with the access points. Moreover, a given beacon may be associated with a given access point and may include: information specifying a channel of a given link, an RNR providing information about at least the access points, and a field (which may be one byte in length) that indicates when the given access point is included in the AP MLD.

Note that the RNR may include information about an additional access point cohosted by the electronic device, and the additional access point may not be included in the AP MLD and may have a second SSID and a second MAC address different from the first SSID and the first MLD MAC address. In some embodiments, a BSSID in the given beacon is derived from the first MLD MAC address. For example, the BSSID in the given beacon may include the first MLD MAC address and a link-specific portion specifying a link identifier.

In some embodiments, the electronic device optionally performs one or more additional operations (operation 312). For example, the electronic device and the recipient electronic device may associate based at least in part on the information included in the given beacon.

Moreover, the given beacon may include a check beacon field that indicates when there is a new parameter or a change in a parameter associated with a link in a band of frequencies. The link may be provided in a same or a different band of frequencies as the given beacon. In some embodiments, the link may be provided by a different access point in the access points than the given access point associated with the given beacon.

Note that one of the access points may scan a subset of the links, which excludes the link, to obtain the changed parameter. Alternatively or additionally, in response to the given beacon, the electronic device may receive a query from the recipient electronic device for information about the change in the parameter. Then, the electronic device may transmit a response to the recipient electronic device with the information about the change in the parameter. This query and the response may be transmitted after the recipient electronic device associates with at least one of the access points. Additionally, the query and the response may be encrypted. In some embodiments. the query and the response are: encrypted using a PASN authentication key prior to association between the recipient electronic device and at least the one of the access points; and/or are communicated using PMFs after the association between the recipient electronic device and at least the one of the access points.

Furthermore, subsets of the access points in the different bands of frequencies may include a first AP MLD and a second AP MLD. Moreover, for a first access point in the first AP MLD in a band of frequencies in the bands of frequencies and a second access point in the second AP MLD in the band of frequencies, a beacon in the beacons may include a multi-BSSID beacon. Furthermore, the multi-BSSID beacon may include a transmitted BSSID of the first access point and link-specific operational parameters of the first access point, and a non-transmitted BSSID of the second access point and relative differences in link-specific operational parameters of the second access point. Alternatively or additionally, the multi-BSSID beacon may include a transmitted BSSID of the first access point, link-specific operational parameters of the first access point, a first MLD element of the first access point, and a second MLD element of the second access point.

Note that the second access point may include a virtual access point. Moreover, the multi-BSSID may include an MLD element of the first access point. Furthermore, the multi-BSSID may include relative differences in an MLD element of the second access point. Additionally, the multi-BSSID may include an RNR providing information about at least access points in the first AP MLD and the second AP MLD.

Additionally, the electronic device may perform authentication with the recipient electronic device to determine an encryption key, where the authentication is performed in a band of frequencies associated with one of the access points prior to association between the recipient electronic device and the one of the access points.

Note that the encryption key may be used to encrypt communication between the recipient electronic device and the one of the access points. For example, the encryption key may be determined using PASN authentication. In some embodiments, the PASN authentication occurs in the band of frequencies associated with the one of the access points.

Moreover, the encryption key may be used to encrypt communication between the recipient electronic device and the access points. This communication may use the first MAC address for the access points. Alternatively or additionally, the communication may use the link-specific MAC addresses for the access points.

Furthermore, the electronic device may receive, a query from the recipient electronic device for information associated with one or more of the access points or the links. In response to the query, the electronic device may transmit a response to the recipient electronic device with the information. Note that the query and the response may be encrypted using the encryption key. Additionally, the query and the response may be communicated in the band of frequencies. In some embodiments, the query may include a GAS request and the response may include a GAS response. The information may include communication performance of the one or more of the access points or the links. Moreover, the electronic device may associate with the recipient electronic device based at least in part on the information, and the communication during the association may be encrypted using the encryption key. Furthermore, the electronic device may communicate with the recipient electronic device using PMFs after the association with the recipient electronic device.

Figure 4:
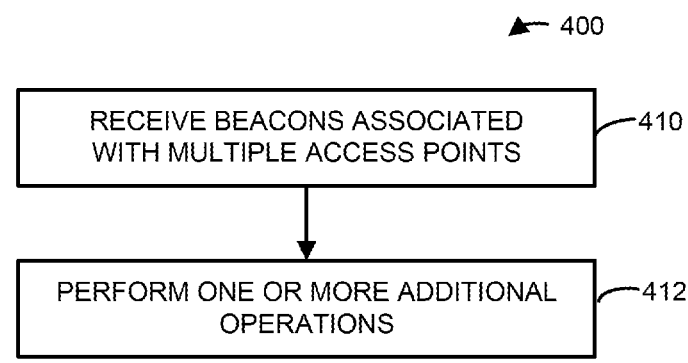
FIG. 4 is a flow diagram illustrating an example method for receiving beacons associated with multiple access points using an electronic device of FIG. 2.

FIG. 4 presents a flow diagram illustrating an example method 400 for receiving beacons associated with multiple access points. This method may be performed by a recipient electronic device, such as electronic device 110-1 in FIG. 1. Note that the communication with an electronic device may be compatible with an IEEE 802.11 communication protocol.

During operation, the recipient electronic device may receive the beacons associated with the multiple access points (operation 410), which are cohosted by an electronic device, and that provide concurrent links in different bands of frequencies, where the access points include or are included in an AP MLD. The beacons may include a first SSID associated with the access points, and a first MLD MAC address associated with the access points. Moreover, a given beacon may be associated with a given access point and may include: information specifying a channel of a given link, an RNR providing information about at least the access points, and a field (which may be one byte in length) that indicates when the given access point is included in the AP MLD.

Note that the RNR may include information about an additional access point cohosted by the electronic device, and the additional access point may not be included in the AP MLD and may have a second SSID and a second MAC address different from the first SSID and the first MLD MAC address. In some embodiments, a BSSID in the given beacon is derived from the first MLD MAC address. For example, the BSSID in the given beacon may include the first MLD MAC address and a link-specific portion specifying a link identifier.

In some embodiments, the recipient electronic device optionally performs one or more additional operations (operation 412). For example, the recipient electronic device may associate with at least the given access point based at least in part on the information included in the given beacon before all of the beacons are received.

Moreover, the given beacon may include a check beacon field that indicates when there is a new parameter or a change in a parameter associated with a link in a band of frequencies. The link may be provided in a same or a different band of frequencies as the given beacon. In some embodiments, the link may be provided by a different access point in the access points than the given access point associated with the given beacon.

Note that the recipient electronic device may scan a subset of the links, which excludes the link, to obtain the changed parameter. Alternatively or additionally, in response to the given beacon, the recipient electronic device may transmit a query for information about the change in the parameter to the electronic device. Then, the recipient electronic device may receive a response from the electronic device with the information about the change in the parameter. This query and the response may be transmitted after the recipient electronic device associates with at least one of the access points. Additionally, the query and the response may be encrypted. In some embodiments. the query and the response are: encrypted using a PASN authentication key prior to association between the recipient electronic device and at least the one of the access points; and/or are communicated using PMFs after the association between the recipient electronic device and at least the one of the access points.

Moreover, the given beacon may be associated with a first link in the links in a band of frequencies. In response, the recipient electronic device may perform an operation to maintain a second link in the links in a different band of frequencies than the first link using information included in the given beacon. Note that the first link may be provided in a same of a different band of frequencies as the given beacon. For example, the operation may be included in a first set of operations when the first link is provided in a same band of frequencies as the given beacon. Alternatively, the operation may be included in a second set of operations when the first link is provided in a different band of frequencies from the given beacon. Additionally, the first set of operations may be at least partially different from the second set of operations. In some embodiments, the operation may be included in a set of operations that includes: time synchronization, determining availability of one of the access points, determining an assessment of the first link, or determining a congestion level of the one of the access points.

Furthermore, subsets of the access points in the different bands of frequencies may include a first AP MLD and a second AP MLD. Moreover, for a first access point in the first AP MLD in a band of frequencies in the bands of frequencies and a second access point in the second AP MLD in the band of frequencies, a beacon in the beacons may include a multi-BSSID beacon. Furthermore, the multi-BSSID beacon may include a transmitted BSSID of the first access point and link-specific operational parameters of the first access point, and a non-transmitted BSSID of the second access point and relative differences in link-specific operational parameters of the second access point. Alternatively or additionally, the multi-BSSID beacon may include a transmitted BSSID of the first access point, link-specific operational parameters of the first access point, a first MLD element of the first access point, and a second MLD element of the second access point.

Note that the second access point may include a virtual access point. Moreover, the multi-BSSID may include an MLD element of the first access point. Furthermore, the multi-BSSID may include relative differences in an MLD element of the second access point. Additionally, the multi-BSSID may include an RNR providing information about at least access points in the first AP MLD and the second AP MLD.

Additionally, the recipient electronic device may perform authentication with the electronic device to determine an encryption key, where the authentication is performed in a band of frequencies associated with one of the access points prior to association between the recipient electronic device and at least the one of the access points.

Note that the encryption key may be used to encrypt communication between the recipient electronic device and the one of the access points. For example, the encryption key may be determined using PASN authentication. In some embodiments, the PASN authentication occurs in the band of frequencies associated with the one of the access points.

Moreover, the encryption key may be used to encrypt communication between the recipient electronic device and the access points. This communication may use the first MAC address for the access points. Alternatively or additionally, the communication may use the link-specific MAC addresses for the access points.

Furthermore, the recipient electronic device may transmit, a query to the electronic device for information associated with one or more of the access points or the links. In response to the query, the recipient electronic device may receive a response from the electronic device with the information. Note that the query and the response may be encrypted using the encryption key. Additionally, the query and the response may be communicated in the band of frequencies. In some embodiments, the query may include a GAS request and the response includes a GAS response. The information may include communication performance of the one or more of the access points or the links. Moreover, the recipient electronic device may associate with the electronic device based at least in part on the information, and the communication during the association may be encrypted using the encryption key. Furthermore, the recipient electronic device may communicate with the electronic device using PMFs after the association with the electronic device.

In some embodiments of method 300 (FIG. 3) and/or 400 there may be additional or fewer operations. Further, one or more different operations may be included. Moreover, the order of the operations may be changed, and/or two or more operations may be combined into a single operation or performed at least partially in parallel.

Figure 5:
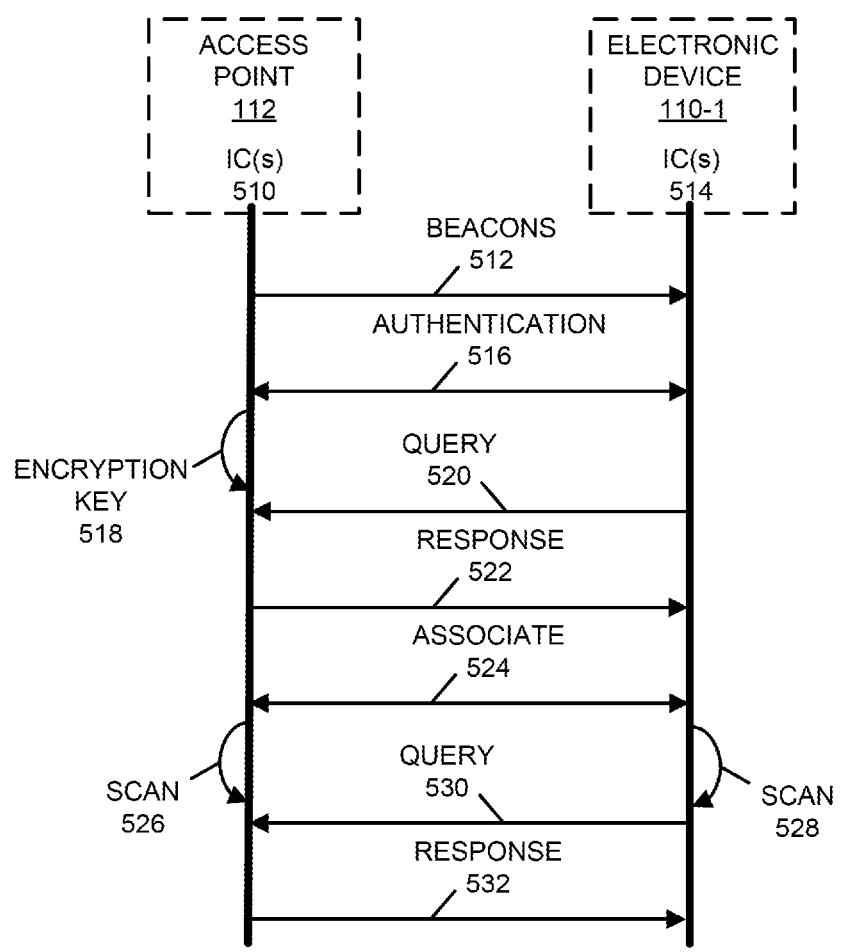
FIG. 5 is a drawing illustrating an example of communication among components in the electronic devices of FIG. 2.

The communication techniques are further illustrated in FIG. 5, which presents a flow diagram illustrating an example of communication among components in electronic device 110-1 and access point 112. During operation, one or more interface circuits (ICs) 510 in access point 112 may transmit beacons 512 associated with multiple access points, which are cohosted by access point 112, and that provide concurrent links in different bands of frequencies, where the access points include or are included in an AP MLD. One or more of these beacons may be received by one or more interface circuits 514 in electronic device 110-1.

Moreover, one or more of interface circuits 510 may perform authentication 516 with one or more of interface circuits 514 to determine an encryption key 518, where authentication 516 is performed in a band of frequencies associated with one of the access points prior to association 524 between electronic device 110-1 and at least one of the access points that uses one of the one or more interface circuits 510. Note that encryption key 518 may be used to encrypt communication between electronic device 110-1 and the one of the access points.

Furthermore, in response to receiving the given beacon, one of the one or more interface circuits 514 may transmit a query 520 to access point 112 for information about the access points or the links. After receiving query 520, one of the one or more interface circuits 510 may transmit a response 522 to electronic device 110-1 with the information about the access points or the links. Note that query 520 and response 522 may be encrypted using encryption key 518.

Additionally, based at least in part on the information included in a given beacon and/or response 522, one or more of interface circuits 514 and one or more interface circuits 510 (which may be associated with or used by one of the access points) may associate 524 or establish a connection or pairing.

Note the given beacon may include a check beacon field that indicates when there is a new parameter or a change in a parameter associated with a link in a band of frequencies. One of the one or more interface circuits 510 associated with one of the access points and/or one of interface circuits 514 may scan 526 or 528 a subset of the links, which excludes the link, to obtain a changed parameter associated with a link in the band of frequencies. Alternatively or additionally, in response to receiving the given beacon, one of the one or more interface circuits 514 may transmit a query 530 to access point 112 for information about the change in the parameter. After receiving query 530, one of the one or more interface circuits 510 may transmit a response 532 to electronic device 110-1 with the information about the change in the parameter.

While communication between the components in FIG. 5 are illustrated with unilateral or bilateral communication (e.g., lines having a single arrow or dual arrows), in general a given communication operation may be unilateral or bilateral.

In some embodiments, the communication techniques facilitate the use of an AP MLD. As discussed previously, IEEE 802.11be has proposed the use of multiple concurrent links between electronic devices, such as an access point and an associated client or station. These concurrent links may be in different bands of frequencies, such as 2.4, 5 and/or 6 GHz bands of frequencies. However, the proposed use of multiple links raises challenges with link discovery and setup or configuration.

In the disclosed communication techniques, several embodiments are disclosed to address these problems, including: beacon frame content (such as a check beacon, a multi-BSS beacon structure and/or RNR fields or formats); a MLD query (which allows discovery of AP MLD parameters); and a PASN for IEEE 802.11be-compatible electronic devices (such as the use of PASN in link setup, PASN security setup with station (non-access point) MLD, AP MLD, and ML operation). For example, the beacon frame content may include a MAC address hierarchy that can reduce the beacon size, and access-point link and parameter maintenance may be facilitated through the use of the RNR and the beacon.

Moreover, as shown FIG. 2, an MLD may include multiple access points 210 or multiple non-access point stations 218 on different links 216. Existing beaconing and discovery techniques need to be extended to allow: fast discovery and ML setup between an AP MLD and a non-AP MLD, while maintaining the support for legacy stations to discover and associate to the AP MLD; and ML maintenance (multiple associations maintenance) with the AP MLD.

Furthermore, legacy discovery operations may vary in different bands of frequencies (such as 2.4 and 5 GHz versus 6 GHz), and may include in-band active scanning (e.g., a probe request and a probe response), in-band passive scanning (e.g., using beacons or unsolicited frames), and/or out-of-band discovery (e.g., a probe request and a probe response in a different band of frequencies). For example, in the 2.4 and 5 GHz bands of frequencies: in-band active scanning may include a non-access point station transmitting a probe request on each potential channel without limitation; in-band passive scanning may include a non-access point station passively monitoring beacons on each potential channel; and a non-access point station discovering cohosted access points/BSSs and neighboring access points/BSSs via RNRs that are included in beacons. Alternatively, in the 6 GHz band of frequencies: in-band active scanning may include a non-access point station only being allowed to conduct limited scanning (such as when a channel idle for more than 6 ms, broadcasting a probe request on a preferred scanning channel or PSC), and/or probe request transmissions being limited to 20 time units or Tus, e.g., 1 TU may equal 1.024 ms); in-band passive scanning may include a non-access point station achieving much faster passive scanning if an access point transmits an unsolicited probe response every 20 time units; and out-of-band discovery may include a non-access point station being able to discover cohosted 6 GHz access points/BSSs via beacons (with RNRs) received in the 2.4 and/or 5 GHz bands. Note that the 2.4 and 5 GHz access points may include cohosted 6 GHz access point information in an RNR.

Additionally, a non-access point station may start scanning from a 2.4 GHz band of frequencies (which may have three 20 MHz wide channels) to discover in-band legacy access points and/or out-of-band legacy access points. Based at least in part on the out-of-band discovery from the 2.4 GHz band of frequencies, the non-access point station may scan for a subset of the 5 GHz and/or 6 GHz channels for interesting access points/BSSs. Note that a 5 GHz band of frequencies may include 25 channels and a 6 GHz band of frequencies may include 59 channels.

Note that a tri-band AP MLD may provide different services using different BSSIDs in different bands of frequencies. For example, a first BSSID (bssida00) may specify a WLAN, called 'home' (which is an example of an SSID), that has concurrent links in the 2.4, 5 and 6 GHz bands of frequencies. Similarly, a second BSSID (bssida01) may specify a WLAN, called 'guest', that has concurrent links in the 2.4, 5 and 6 GHz bands of frequencies. Additionally, there may be a third BSSID (bssida02) for a WLAN, called 'Internet of Things' (IoT), in the 2.4 GHz band of frequencies. Note that beacons in the 2.4 and 5 GHz band of frequencies for any of the BSSIDs may be cohosted (i.e., each access point may transmit separate beacons that can be received by legacy stations), and there may be a multi-BSS beacon in the 6 GHz band of frequencies. For example, the first BSSID in the multi-BSS beacon may be a transmitted BSSID, while the second BSSID in the multi-BSS beacon may be a non-transmitted BSSID. The multi-BSS beacon may avoid each BSS transmitting a separate beacon. Moreover, passive or active scans in any of the bands of frequencies may be used to discover information about these BSSIDs and associated parameters for the WLANs. In some embodiments, there may be concurrent communication of a data stream using one or more of the links provided by an AP MLD.

Table 1 illustrates an example of the information that can be discovered in the beacons from an AP MLD in different bands of frequencies for each of these WLANs. Note that a given WLAN may have a separate SSID and MAC address that is common across the bands of frequencies used by this WLAN. The access points in the given WLAN may have BSSIDs that are derived from a common MLD MAC address of given WLAN and may include a link-specific portion specifying a given access point. In addition, note that an RNR and parameters for other access points (or links) in the same AP MLD may be available in any of the bands of frequencies.

TABLE 1

| | | AP MLD-Home | AP MLD-Guest | AP MLD-IoT |
|---|---|---|---|---|
| 2.4 GHz | | AP1<br>SSID: Home<br>BSSID: bssida00<br>MLD MAC: bssid_h<br>Capabilities and Operations of the reporting AP:<br>Legacy Parameters, EHT Parameters<br>MLD Parameters<br>Other APs:<br>Reduced Neighbor Report Parameters of other APs in same AP MLD | AP2<br>SSID: Guest<br>BSSID: bssida01<br>MLD MAC: bssid_g<br>Capabilities and Operations of the reporting AP:<br>Legacy Parameters, EHT Parameters<br>MLD Parameters<br>Other APs:<br>Reduced Neighbor Report Parameters of other APs in same AP MLD | AP3<br>SSID: IoT<br>BSSID: bssida02<br>MLD MAC: bssid_i<br>Capabilities and Operations of the reporting AP:<br>Legacy Parameters, EHT Parameters<br>MLD Parameters<br>Other APs:<br>— |
| 5 GHz | | AP4<br>SSID: Home<br>BSSID: bssidb00<br>MLD MAC: bssid_h<br>Capabilities and Operations of the reporting AP:<br>Legacy Parameters, EHT Parameters<br>MLD Parameters<br>Other APs:<br>Reduced Neighbor Report Parameters of other APs in same AP MLD | AP5<br>SSID: Guest<br>BSSID: bssidb01<br>MLD MAC: bssid_g<br>Capabilities and Operations of the reporting AP:<br>Legacy Parameters, EHT Parameters<br>MLD Parameters<br>Other APs:<br>Reduced Neighbor Report Parameters of other APs in same AP MLD | NA |
| 6 GHz | | AP6<br>SSID: Home<br>BSSID: bssidc00<br>MLD MAC: bssid_h<br>Capabilities and Operations of the reporting AP:<br>Legacy Parameters, EHT | AP7<br>SSID: Guest<br>BSSID: bssidc01<br>MLD MAC: bssid_g<br>Capabilities and Operations of the reporting AP:<br>Legacy Parameters, EHT | NA |

TABLE 1-continued

| AP MLD-Home | AP MLD-Guest | AP MLD-IoT |
| --- | --- | --- |
| Parameters<br>MLD Parameters<br>Other APs:<br>Reduced Neighbor Report<br>Parameters of other APs<br>in same AP MLD | Parameters<br>MLD Parameters<br>Other APs:<br>Reduced Neighbor Report<br>Parameters of other APs<br>in same AP MLD | |

Moreover, a variety of information can be discovered from an AP MLD. For example, access point 1 in Home in the 2.4 GHz band of frequencies may provide a beacon with an RNR providing information about access points 4 and 6, which are in Home in the 5 and 6 GHz bands of frequencies, respectively. Furthermore, access point 2 in Guest in the 2.4 GHz band of frequencies may provide a beacon with an RNR providing information about access points 5 and 7, which are in Guest in the 5 and 6 GHz bands of frequencies, respectively. Access point 3 in IoT in the 2.4 GHz band of frequencies may provide a beacon with an empty RNR.

Similarly, access point 4 in Home in the 5 GHz band of frequencies may provide a beacon with an RNR providing information about access points 1 and 6, which are in Home in the 2.4 and 6 GHz bands of frequencies, respectively. Additionally, access point 5 in Guest in the 5 GHz band of frequencies may provide a beacon with an RNR providing information about access points 2 and 7, which are in Guest in the 2.4 and 6 GHz bands of frequencies, respectively.

Furthermore, access point 6 in Home in the 6 GHz band of frequencies may provide a beacon with an RNR providing information about access points 1 and 4, which are in Home in the 2.4 and 5 GHz bands of frequencies, respectively. Access point 7 in Guest in the 6 GHz band of frequencies may provide a beacon with an RNR providing information about access points 2 and 5, which are in Guest in the 2.4 and 5 GHz bands of frequencies, respectively.

Thus, a given beacon with an RNR, which is available in any of the bands of frequencies may at least include cohosted access points in the same AP MLD (which may have the same SSID and the same MLD MAC address).

Note that there may be legacy stations that do not support multi-BSSID elements. Consequently, as discussed previously, access points in the 2.4 and 5 GHz bands of frequencies may be cohosted and may need to send separate beacons for the AP MLD and for legacy stations. However, 6 GHz stations may support multi-BSSID elements. Therefore, access points in the 6 GHz band of frequencies may consolidate their beacons by using multi-BSSID elements.

In general, an RNR may include information about all the access points in the same AP MLD. Moreover, a beacon may include a complete or a partial profile of other access-point link specific parameters.

However, if all of this information (including in-band information about the AP MLD and access points, out-of-band information, e.g., in an RNR, and a partial or a complete set of parameters for cohosted access points) is discoverable over one link, the beacons may become too large. Consequently, the partial or the complete set of parameters for cohosted access points may be excluded from the beacons.

Note that a non-AP MLD may scan all the links anyway to evaluate link quality. In order to accelerate connection setup, the non-AP MLD may start authentication and association on the first discovered link while evaluating other links. Once a non-AP MLD discovers an AP MLD on one link, it may transmit a unicast ML query management frame to the AP MLD to collect the detailed capability and operation information for the cohosted access points.

Figure 6:
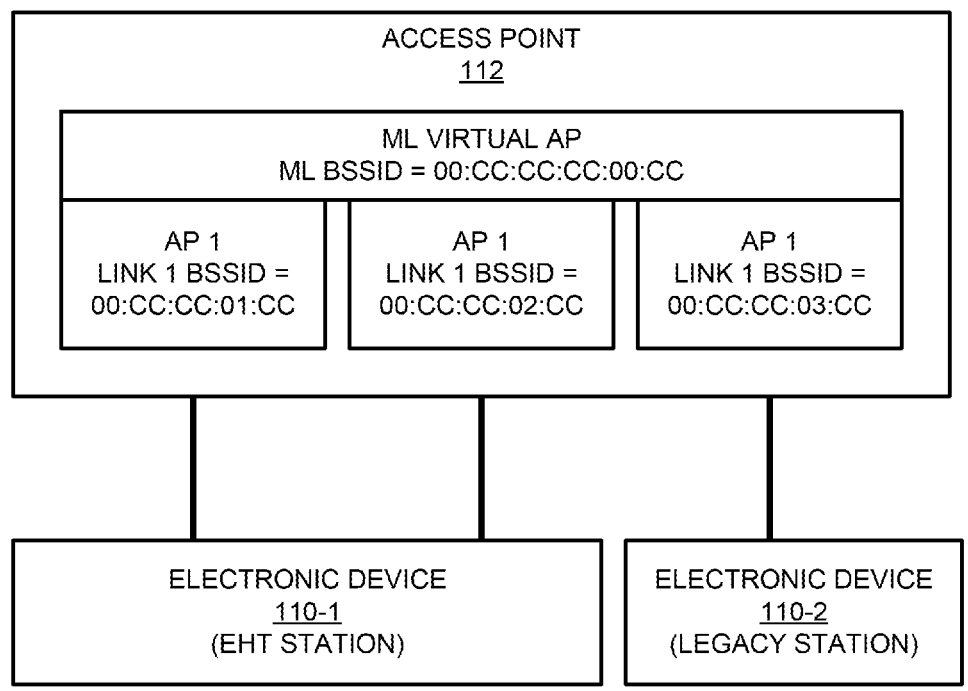
FIG. 6 is a drawing illustrating an example of communication between electronic devices of FIG. 2.

Table 2 summaries an example of a MLD MAC address hierarchy, and FIG. 6 presents a drawing illustrating an example of communication between electronic devices of FIG. 2. Notably, access point 112 may be an extremely high throughput (EHT) access point. This extremely high throughput access point may host an AP MLD via a ML virtual access point having a mask of FF:FF:FF:FF:00:FF and an ML BSSID of 00:CC:CC:CC:00:CC, where the last 'CC' specifies the MLD address of the ML virtual access point. The ML virtual access point may include: a first access point having a first link in the 2.4 GHz band of frequencies with a link BSSID of 00:CC:CC:01:CC that communicates with an extremely high throughput station; a second access point having a second link in the 5 GHz band of frequencies with a link BSSID of 00:CC:CC:02:CC that communicates with an extremely high throughput station; and a third access point having a third link in the 6 GHz band of frequencies with a link BSSID of 00:CC:CC:03:CC that communicates with a legacy station. Based on the over-the-air link BSSID, a given station can determine the MLD address and the link identifier. In some embodiments, the last 'CC' that identifies the AP MLD may be included to the RNR as a short identifier of the AP MLD. Similarly, as in multi-BSS and cohosted beacons, this information can identify the MLD in the physical device that is reported.

A given MAC address (such as the MLD MAC address, the first access point MAC address, the second access point MAC address or the third access point MAC address) may include a ML component, a link-specific component, and ML information for cohosted multi-BSSIDs. Notably, octets 0-3 in frames may be unchanged, octet 4 (with 1-8 bits) may be a link specific component, and octet 5 may include ML information (such as the multi-BSSID or the multi-MLD). Moreover, the BSSID of a given access point may include the MLD MAC address and the link identifier. For example, the link-specific component for the virtual AP MLD may be '000', the link-specific component for the first access point may be '001', the link-specific component for the second access point may be '010', and the link-specific component for the third access point may be '011'. Using the link-specific information in the MLD MAC address, the BSSID and the link identifier (and, thus, the MLD MAC address) can be derived. Note that the link-specific component may start from the least significant bit of octet 4. The MLD MAC address may include the number of bits M that are in the MLD MAC address mask, where, e.g., M is greater than zero and less than or equal to 8 (such as 3 for the configuration shown in FIG. 6). In some embodiments the BSSID identifier may also be included in the RNR, and the BSSID identifier may be used as a short value for the AP/BSS in a specific channel.

TABLE 2

|  | AP MLD-Home | AP MLD-Guest | AP MLD-IoT |
|---|---|---|---|
| 2.4 GHz | AP1<br>SSID: Home<br>BSSID: bssida00<br>MLD MAC: bssid_h | AP2<br>SSID: Guest<br>BSSID: bssida01<br>MLD MAC: bssid_g | AP3<br>SSID: IoT<br>BSSID: bssida02<br>MLD MAC: bssid_i |
| 5 GHz | AP4<br>SSID: Home<br>BSSID: bssidb00<br>MLD MAC: bssid_h | AP5<br>SSID: Guest<br>BSSID: bssidb01<br>MLD MAC: bssid_g | NA |
| 6 GHz | AP6<br>SSID: Home<br>BSSID: bssidc00<br>MLD MAC: bssid_h | vAP7<br>SSID: Guest<br>BSSID: bssidc01<br>MLD MAC: bssid_g | NA |

As shown in Table 3, the BSSID, the SSID and the MLD MAC address may be common across the access points in the different frequency bands for a given WLAN in the AP MLD. The BSSIDs and MLD MAC addresses are incremented over the three supported WLANs in the AP MLD.

TABLE 3

|  | AP MLD-Home | AP MLD-Guest | AP MLD-IoT |
|---|---|---|---|
| 2.4 GHz | AP1<br>SSID: Home<br>BSSID: ::01:00<br>MLD MAC: ::00:00 | AP2<br>SSID: Guest<br>BSSID: ::01:01<br>MLD MAC: ::00:01 | AP3<br>SSID: IoT<br>BSSID: ::01:02<br>MLD MAC: ::00:02 |
| 5 GHz | AP4<br>SSID: Home<br>BSSID: ::02:00<br>MLD MAC: ::00:00 | AP5<br>SSID: Guest<br>BSSID: ::02:01<br>MLD MAC: ::00:01 | NA |
| 6 GHz | AP6<br>SSID: Home<br>BSSID: ::03:00<br>MLD MAC: ::00:00 | vAP7<br>SSID: Guest<br>BSSID: ::03:01<br>MLD MAC: ::00:01 | NA |

Moreover, Tables 4 and 5 illustrate an example of the RNR in a beacon. The RNR may include neighbor access-point information (e.g., one per reported channel), such as: cohosted access point, operating class, channel number, and/or a number of TBTT (a target beacon transmission time, which is a time interval measured in time units) information set (for BSSs in the same channel). Furthermore, the RNR may include TBTT information set (e.g., one per reported access point or virtual access point in the 6 GHz band of frequencies), such as: a TBTT offset, a BSSID (the MLD MAC address and the link identifier), a short SSID, and/or a BSS parameter (e.g., OCT (1 bit), the same SSID (1 bit), the multiple BSSID (1 bit), the transmitted BSSID (1 bit), a cohosted extended service set or ESS (1 bit), a 20 time unit probe response (1 bit), and/or an access point in an AP MLD (1 bit)). For example, when an access point is included in an AP MLD, the AP MLD bit in the RNR may be set to '1'.

TABLE 4

|  | AP MLD-Home | AP MLD-Guest | AP MLD-IoT |
|---|---|---|---|
| 2.4 GHz | AP1<br>SSID: Home<br>BSSID: bssida00<br>MLD MAC: bssid_h<br>Capabilities and Operations<br>of the reporting AP:<br>Legacy Parameters, EHT<br>Parameters MLD Parameters | AP2<br>. . . | AP3<br>. . . |

TABLE 4-continued

|  | AP MLD-Home | AP MLD-Guest | AP MLD-IoT |
|---|---|---|---|
|  | Other APs:<br>Reduced Neighbor Report<br>Parameters of other APs in<br>same AP MLD | | |
| 5 GHz | AP4<br>SSID: Home<br>BSSID: bssidb00<br>MLD MAC: bssid_h<br>Capabilities and Operations<br>of the reporting AP:<br>Legacy Parameters, EHT<br>Parameters MLD Parameters<br>Other APs:<br>Reduced Neighbor Report<br>Parameters of other APs<br>in same AP MLD | AP5<br>. . . | NA |
| 6 GHz | AP6<br>SSID: Home<br>BSSID: bssidc00<br>MLD MAC: bssid_h<br>Capabilities and Operations<br>of the reporting AP:<br>Legacy Parameters, EHT<br>Parameters MLD Parameters<br>Other APs:<br>Reduced Neighbor Report<br>Parameters of other APs in<br>same AP MLD | vAP7<br>. . . | NA |

TABLE 5

Reduced Neighbor Report information

Neighbor AP Information (One per reported Channel):
Cohosted AP
Operating Class
Channel Number
Number of TBTT Information Set (for BSSs in same Channel)
TBTT Information Set (one per reported AP/vAP)
TBTT Offset
BSSID (specifies MLD MAC address, link identifier)
Short-SSID
BSS Parameters
OCT (1 bit)
Same SSID (1 bit)
Multiple BSSID (1 bit)
Transmitted BSSID (1 bit)
Cohosted ESS (1 bit)
20 TU Probe Response (1 bit)
AP in MLD AP (1 bit)

Furthermore, Tables 6-8 illustrate different examples of multi-BSSID beacons and MLD parameters in a beacon in the 6 GHz band of frequencies. Notably, access point 6 may have a transmitted BSSID (which is common with access points 1 and 4), while access point 7 may have a non-transmitted BSSID (which is common with access points 2 and 5). Thus, access point 7 may be a virtual access point. In some notations, the virtual access points are not considered as an access point and there would be just one access point 6 that operates for both BSSs. While the multi-BSSID beacon information for access point 6 may include extremely high throughput parameters and MLD parameters, the multi-BSSID beacon information for access point 7 may include the delta or difference in the EHT parameters and the MLD parameters.

TABLE 6

| | AP MLD-Home | AP MLD-Guest | AP MLD-IoT |
|---|---|---|---|
| 2.4 GHz | AP 1 ... | AP2 ... | AP3 ... |
| 5 GHz | AP4 ... | AP5 ... | NA |
| 6 GHz | AP6 (Transmitted BSSID) SSID: Home BSSID: bssidc00 MLD MAC: bssid_h Capabilities and Operations of the reporting AP: Legacy Parameters, EHT Parameters MLD Parameters Other APs: Reduced Neighbor Report Parameters of other APs in same AP MLD | vAP7 (Non-Transmitted BSSID) SSID: Guest BSSID: bssidc01 MLD MAC: bssid_g Capabilities and Operations of the reporting AP: Legacy Parameters (delta), EHT Parameters (delta) MLD Parameters (delta) Other APs: Reduced Neighbor Report Parameters of other APs in same AP MLD | NA |

TABLE 7

| Multiple-BSSID Beacon | Transmitted BSSID ->Transmitted MLD | ... A3 = Transmitted BSSID Legacy Cap/Op Elements (Link-Specific) EHT Cap/Op Elements (Link-Specific) MLD Element |
|---|---|---|
| | Multi-BSSID Element (Non-Transmitted BSSID ->Non-Transmitted MLD | ... Legacy Cap/Op Elements (delta), EHT Cap/Op Elements (delta), MLD elements (delta) |
| | Cohosted | ... RNR Element ... |

TABLE 8

| Multiple-BSSID Beacon | ... A3 = Transmitted BSSID Legacy Cap/Op Elements (Link-Specific) EHT Cap/Op Elements (Link-Specific) Multi-BSSID Elements (Link-Specific) ... Transmitted MLD Element Non-Transmitted MLD Element ... RNR Element ... |
|---|---|

For example, in some embodiments, the multi-BSSID beacon may include information for the transmitted BSSID (access point 6), information for one or more non-transmitted BSSIDs (such as access point 7) and an RNR element for cohosted access points in a WLAN provided by an AP MLD. Notably, the information for the transmitted BSSID may include: the transmitted BSSID, link-specific legacy capability/operating elements, link-specific EHT capability/operating elements, and/or an MLD element. Moreover, the information for a given non-transmitted BSSID may include the deltas or the differences in the link-specific legacy capability/operating elements, the link-specific EHT capability/operating elements, and/or the MLD element.

Alternatively, in some embodiments, the multi-BSSID beacon may include: the transmitted BSSID, link-specific legacy capability/operating elements, link-specific EHT capability/operating elements, and/or link-specific multi-BSSID MLD elements. Then, the multi-BSSID beacon may include a field with the transmitted MLD element, separate fields for the one or more non-transmitted MLD elements, and/or a field for the RNR element. Note that the information elements in a beacon may be included in a different order. For example, legacy elements, such as the RNR, or a multiple BSSID element may be transmitted before the EHT/MLD elements that signal information understood by EHT stations (e.g., stations that are compatible with IEEE 802.11be).

Additionally, Table 9 illustrates embodiments of the parameters of other access points in the same AP MLD that are included in beacons in different bands of frequencies. For example, a single beacon may carry a complete set of parameters of other access points in the same AP MLD. Alternatively, a single beacon may carry a partial set of parameters of other access points in the same AP MLD. In some embodiments, a single beacon may carry basic information (e.g., the RNR) and a check beacon of other access points in the same AP MLD. Note that a non-AP MLD may send an additional query or scan other links to obtain detailed parameters of the other access points.

TABLE 9

| | AP MLD-Home | AP MLD-Guest | AP MLD-IoT |
|---|---|---|---|
| 2.4 GHz | AP1 SSID: Home BSSID: bssida00 MLD MAC: bssid_h Capabilities and Operations of the reporting AP: Legacy Parameters, EHT Parameters MLD Parameters | AP2 ... | AP3 ... |

TABLE 9-continued

| | AP MLD-Home | AP MLD-Guest | AP MLD-IoT |
|---|---|---|---|
| | Other APs:<br>Reduced Neighbor Report<br>Parameters of other APs in<br>same AP MLD | | |
| 5<br>GHz | AP4<br>SSID: Home<br>BSSID: bssidb00<br>MLD MAC: bssid_h<br>Capabilities and Operations<br>of the reporting AP:<br>Legacy Parameters, EHT<br>Parameters MLD Parameters<br>Other APs:<br>Reduced Neighbor Report<br>Parameters of other APs in<br>same AP MLD | AP5<br>. . . | NA |
| 6<br>GHz | AP6<br>SSID: Home<br>BSSID: bssidc00<br>MLD MAC: bssid_h<br>Capabilities and Operations<br>of the reporting AP:<br>Legacy Parameters, EHT<br>Parameters MLD Parameters<br>Other APs:<br>Reduced Neighbor Report<br>Parameters of other APs in<br>same AP MLD | vAP7 | NA |

Figure 7:
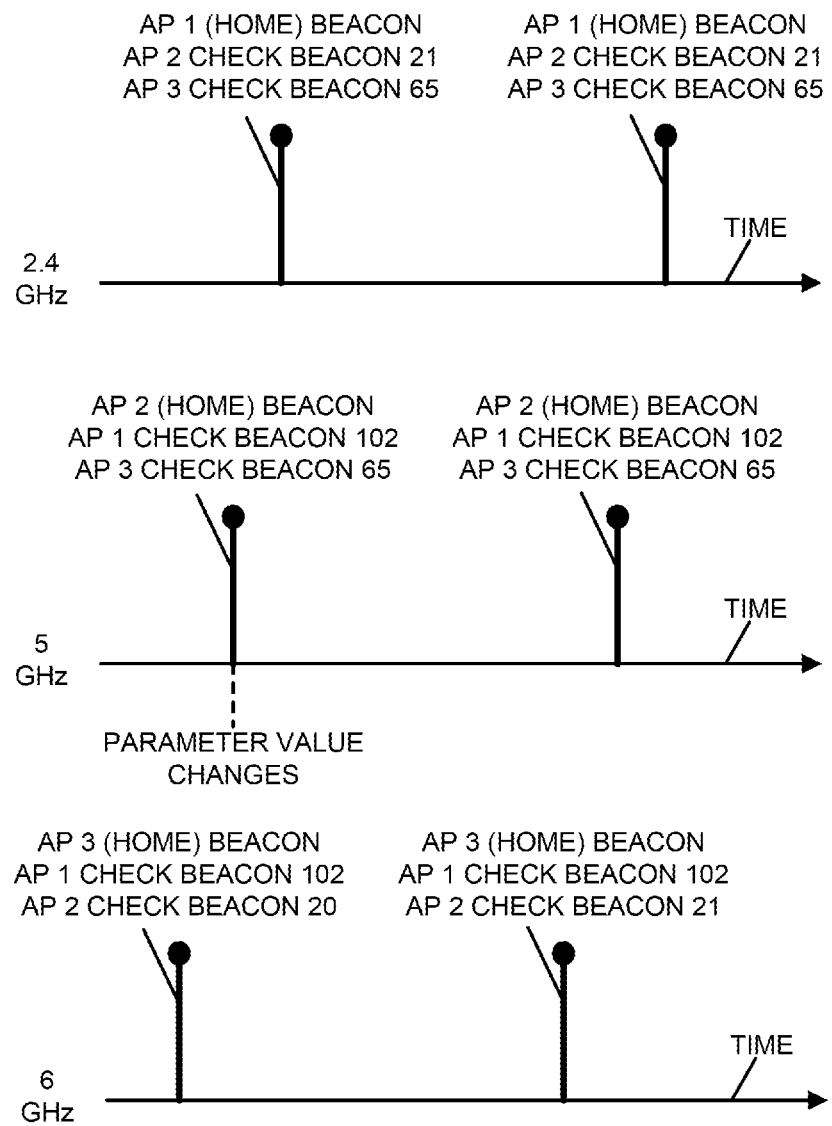
FIG. 7 is a drawing illustrating an example of communication between electronic devices of FIG. 2.

The check beacon may be a counter for an access point-specific operating parameter update. A new value may indicate that the link-specific value has changed or an information element may be added to the beacon requiring a particular operation in the link in the future. For example, the check beacon field may be increased by one if one or more elements are included, such as: a channel switch announcement element, an extended channel switch announcement element, a quiet element, a wide band channel switch element, an operating mode notification element, a quiet channel element and/or a BSS color change announcement element. If one or more elements are modified, including an enhanced distributed channel access (EDCA) parameters element, a direct-sequence spread spectrum (DSSS) parameter set element, a contention-free (CF) parameter set element, a high throughput (HT)/a very high throughput (VHT)/EHT capability or HT/VHT/EHT operation element; and/or if a broadcast targeted wake-up time (TWT) element is inserted for the first time. Note that the target of the check beacon value update may be to signal that a significant operating parameter has changed in an access point and stations need to receive a beacon or probe response frame from the specific access point or another access point in order to update the link-specific operating parameters of the access point. Thus, as shown in FIG. 7, which presents a drawing illustrating an example of communication between electronic devices of FIG. 2, the different value of access point 2 check beacon in the beacons from access point 1 in the 2.4 GHz band of frequencies and/or in the beacons from access point 3 in the 6 GHz band of frequencies may indicate parameter value changes for access point 2 in the 5 GHz band of frequencies. This approach may avoid the need to provide a partial or a complete profile with the parameter values for access point 2 in the 5 GHz band of frequencies in the beacons from access point 1 in the 2.4 GHz band of frequencies and/or in the beacons from access point 3 in the 6 GHz band of frequencies. In some embodiments, the check beacon may use one octet of information in the beacon. Note that the legacy stations may only maintain a single link, so the check beacon field for other access points in an AP MLD may not be relevant for the legacy stations. Moreover, the check beacon field may not be relevant for MLD stations that do not operate with the access point that has an updated parameter value. For example, if the station has poor link with the access point in 6 GHz band of frequencies and the station cannot operate with this access point, or if the MLD station is in a long-term power-save operating mode and does not plan to use a link for which the check beacon counter or value is updated, the station may decide to postpone a parameter update or may ignore the updated parameter value(s).

Moreover, the parameters of other access points in the same AP MLD that are included in a beacon may include different information depending on the embodiment. For example, there may be a complete set of the other access points parameters. This may ensure that the scanning station does not need to receive other beacons/probe responses, and the associated MLD stations can update parameters of all the access points in the AP MLD. However, this approach results in a large beacon and significant overhead. The scanning station may not assess the receive power from the access points. Therefore, the benefit of stopping a scan immediately after a beacon/probe response is received is small.

Alternatively, there may be a partial set of the other access points parameters. The associated station may receive parameter value updates, and a scanning station may obtain the channel, SSID and BSSID of all the access points in an AP MLD. Depending on the added information, the beacon size can be small. However, associated stations may need to receive beacons routinely or continuously from all the access points in the AP MLD to ensure it has up-to-date parameters, and the partial set of access-point parameters may not help scanning stations (the full set may be needed).

Furthermore, there may be the RNR and the check beacon of the other access points in the AP MLD. This approach may have the smallest beacon size. Associated stations may detect a parameter-value change in an access point, and a scanning station may obtain the channel, SSID and BSSID of all the access points in an AP MLD. However, a non-AP MLD station may need to send an additional query or may need to scan other links to obtain the parameters for other access points. If an associated station chooses to not maintain parameter values for an access point, the associated station may use channel information from the RNR element to detect that: this access point still operates in the channel; the access point does not operate anymore; or the access point has changed its primary channel (e.g., the non-AP MLD station may receive an RNR element that includes a BSSID of an access point and a different value in the channel number subfield). An AP MLD may reduce the number of available access points to lower its operating expenses at the times when the network utilization is low. Similarly, the RNR may indicate that a new access point is available in AP MLD.

In some cases, an access point may need to stop operating in a channel immediately. For instance, an access point may detect a radar, such as by using Dynamic Frequency Selection (DFS) in the 5 GHz band of frequencies, or for some other reason the access point may not be allowed to operate in the channel and may need to rapidly silence or cease its transmissions and transmissions from its associated station in the channel. In these cases, other access points in an AP MLD may remove this access point from the RNR element, or if the new operating channel of the access point is already known, the access point may indicate to the access point that it operate immediately in the new operating channel. Alternatively or additionally, the access point may include a new field in the RNR that disallows transmissions to the access point. This field may be used to communicate that stations are not allowed to send any frames to the access point in this channel. The indication may also be transmitted for an access point that is temporarily unavailable, e.g., because of internal calibration or configuration.

In some embodiments, the information included in a beacon from a first access point may be used by an MLD station to maintain a second access-point link. For example, when an in-band station receives a beacon, it may be used to: perform time synchronization (such as time synchronization function or TSF maintenance, e.g., synchronize with the TSF of the beacon with a granularity of 4 s); determine access-point availability (e.g., the beacon may indicate that the access point is available); perform a physical link assessment (e.g., the receive power may be assessed from the received beacon); determine an access-point congestion level (e.g., a (Q)BSS load or delay information); and/or determine buffered downlink traffic (e.g., a traffic indication map may indicate buffered traffic). Alternatively, when another (out-of-band) station in a non-AP MLD receives a beacon, it may be used to: perform time synchronization (such as TSF maintenance, e.g., synchronize with the TBTT offset in time units of the RNR with an accuracy of ±3 ms or it can be more precise); determine access-point availability (e.g., the RNR may indicate the channel in which the access point operates); perform a physical link assessment (e.g., link estimation from the receive power of the received beacon in another link); and/or determine buffered downlink traffic (e.g., a traffic indication map may indicate buffered traffic).

Figure 8:
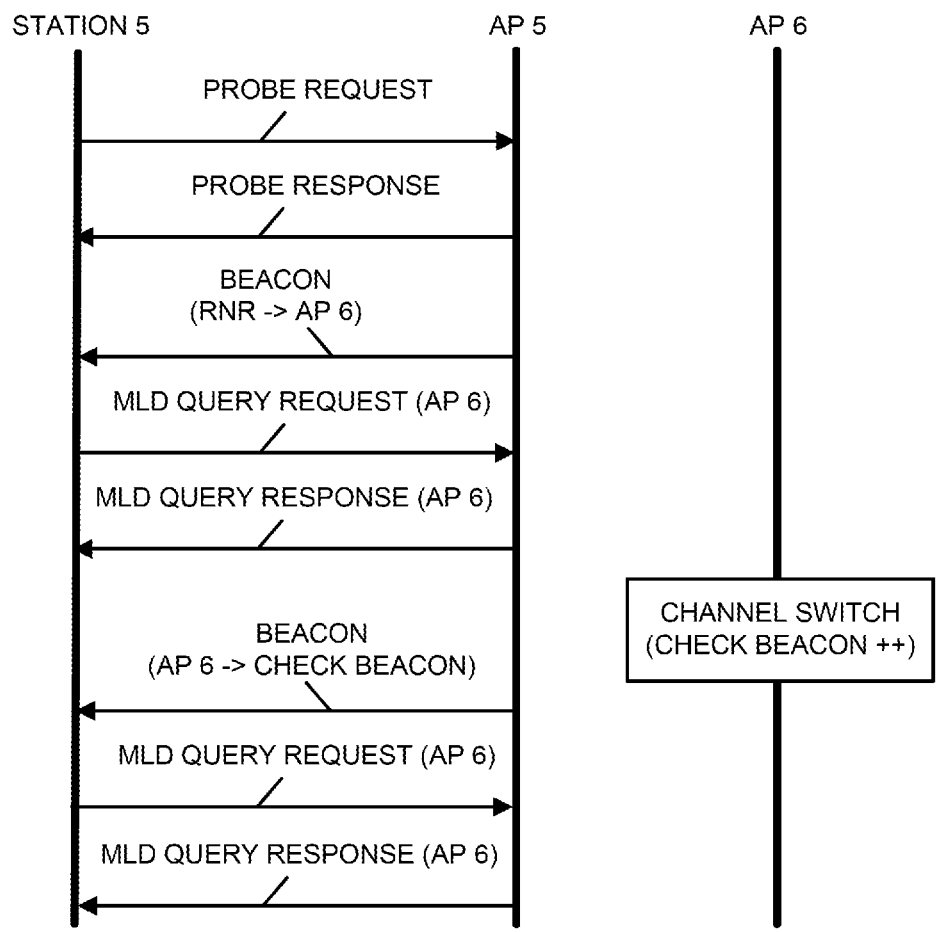
FIG. 8 is a drawing illustrating an example of communication between electronic devices of FIG. 2.

Moreover, as shown in FIG. 8, which presents a drawing illustrating an example of communication between electronic devices of FIG. 2, there may be a protocol for an MLD query to obtain access-point parameters and/or access-point parameters for another access point in response to the check-beacon value. Notably, the AP MLD may use a protocol to: query parameters of an access point to create a prior MLD setup (before association); and/or to query changed operating parameters in a post-associated state. The protocol may be secure. For example, PASN may protect the queries of prior MLD setup. Furthermore, PMFs may protect the queries and responses in the associated state.

Note that there is alternative to limit the MLD query only to the associated state. Notably, if a station in a non-AP MLD station discovers a suitable access point in a link by receiving a beacon or probe response, then the station may establish an MLD setup with the access point. After association, the station may discover the parameters of access points in other links. Additionally, if the parameters of other access points in an AP MLD are very different in other links, the non-AP MLD station may perform MLD setup again and adjust its parameters. Alternatively, the station that has not obtained parameters of other access points in an AP MLD may perform an MLD setup only with the discovered access point. After the other access-point parameters are obtained in the associated state, a second MLD setup may create one or more links to multiple access points. In order to limit the operation only to a post-associated state: an MLD query and MLD response robust unicast management frames may be introduced (e.g., these frames may not be allowed to be transmitted with PASN authentication). In some embodiments, an access network query protocol (ANQP) query may be limited only to the post-association state.

Figure 9:
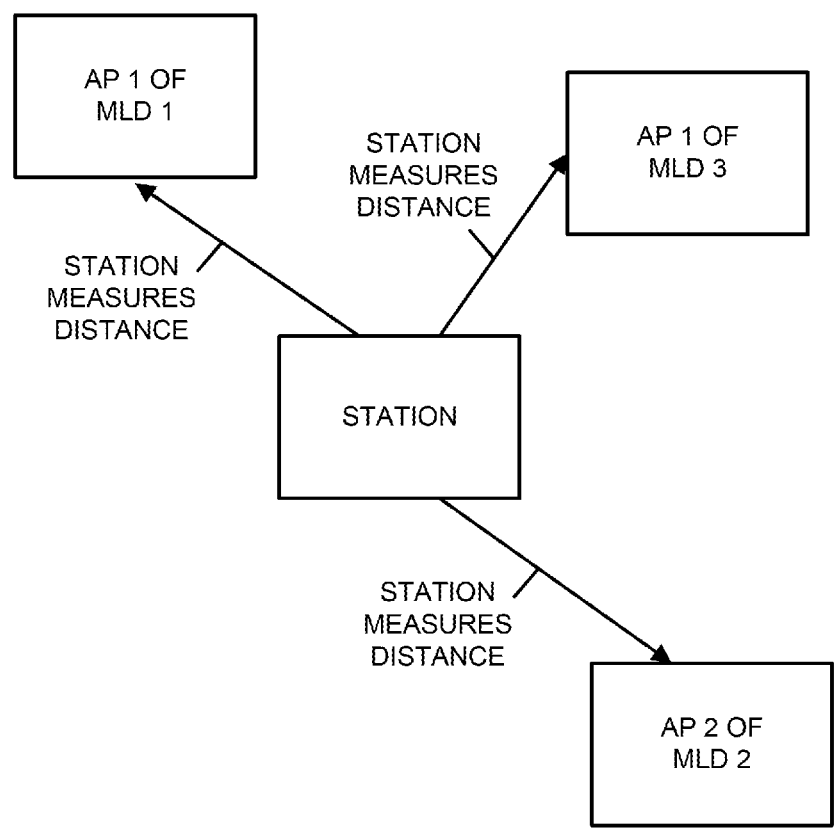
FIG. 9 is a drawing illustrating an example of communication between electronic devices of FIG. 2.

Furthermore, as shown in FIG. 9, which presents a drawing illustrating an example of communication between electronic devices of FIG. 2, there may be a variety of uses cases of secure discovery. For example, station 1 may be associated with access point 1 and may be performing secure fine-time/distance measurement ongoing with access points 1, 2 and 3 (which are in proximity). These measurements may be used to determine the station position in an indoor environment.

At the same time the station may obtain parameters for the access points securely. Notably, during the secure fine-time measurement, the station may detect that the access point to which it is associated has a weaker signal than one or more other access points in proximity. Consequently, the station may scan the available access point(s) securely and may hide its identity from other access point(s).

An example of secure operations and beacon size reduction is to also have a check beacon for the access point that transmitted a beacon. Notably, the beacon may contain only a minimal set of parameters and detailed operating parameters and capabilities may be available only through secure individual discovery. This kind of beacon may be used only with IEEE 802.11be-compatible stations.

Figure 10:
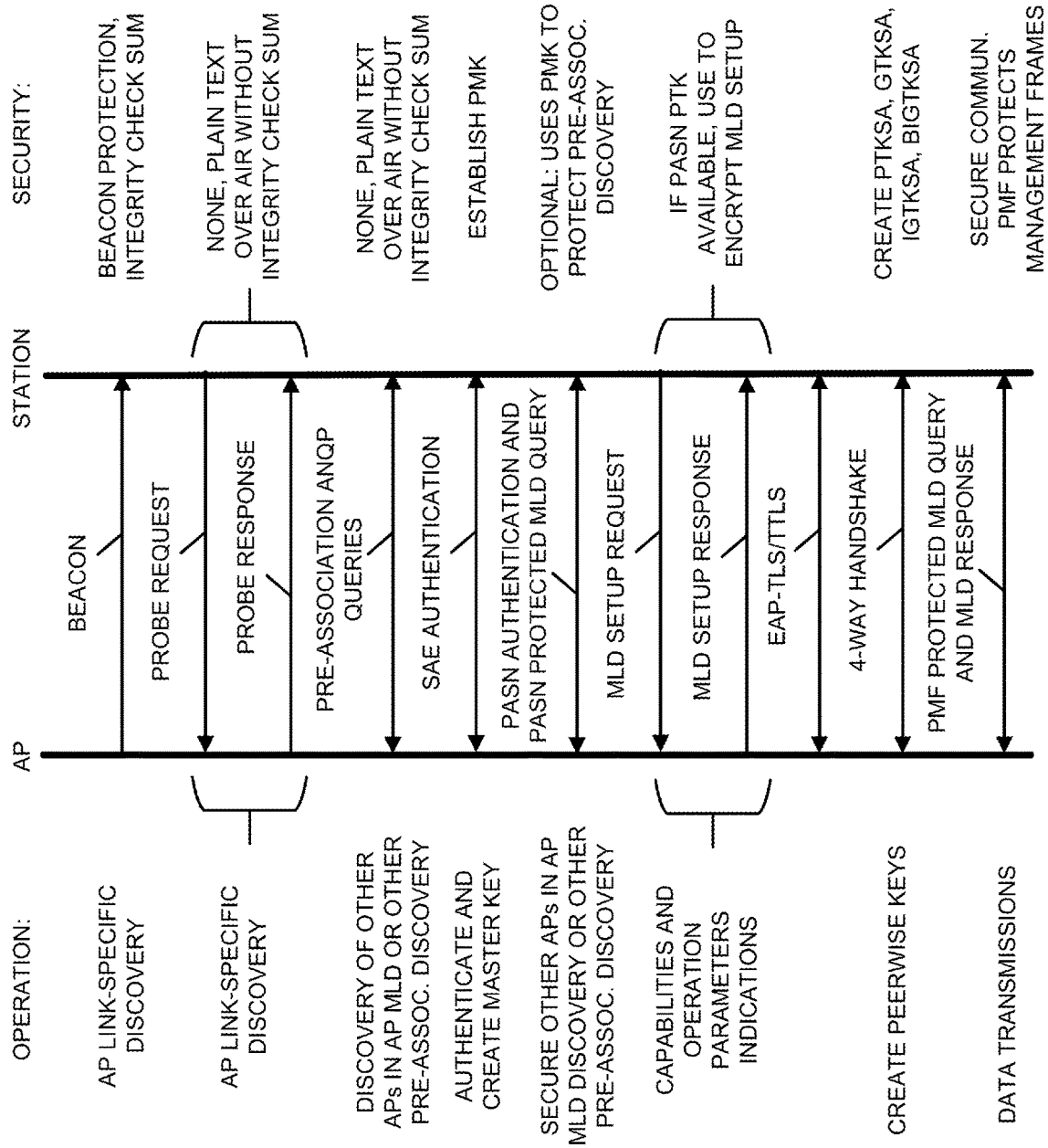
FIG. 10 is a drawing illustrating an example of communication between electronic devices of FIG. 2.
Figure 11:
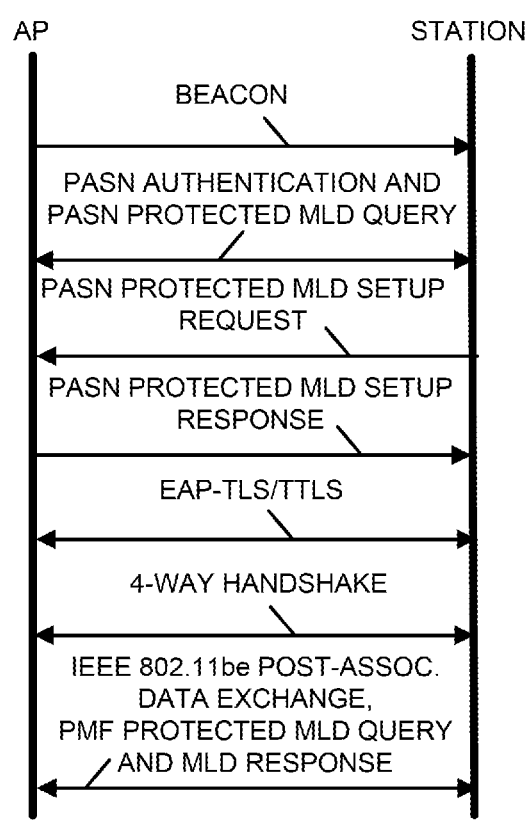
FIG. 11 is a drawing illustrating an example of communication between electronic devices of FIG. 2.

Additionally, as shown in FIGS. 10 and 11, which present drawings illustrating examples of communication between electronic devices of FIG. 2, PASN and PMF may be used in IEEE 802.11be for discovery and MLD setup operations. PASN may require an established and cached pairwise master key (PMK). Note that simultaneous authentication of equals (SAE) authentication may require several messages to be exchanged between an access point and a station.

The link setup phases when a cached PMK is available may include that, if PASN is established, then a PASN pairwise transient key (PTK) may be used to encrypt the MLD setup frames, such as the MLD query and response for parameters for all links from an access point or a different access point. Note that the PTK may be derived from the PMK. For fast link set up, in some embodiments, a station may authenticate and perform MLD setup and may not perform PASN authentication.

PASN is described in IEEE 802.11az. PASN allows a station to send protected dual of management frames or other class 2 frames within state 1. The STA may remain in state 1 and PASN, i.e., the station needs to authenticate and associate with the access point. IEEE 802.11az describes that PASN is used for class 2 (pre-association) frames, including management frames, such as: an association request/response, a reassociation request/response, a disassociation, a unicast protected dual of public action frames when a pairwise transient key secure association (PTKSA) from PASN authentication exists, etc. These frames may be encrypted with a PTK created in PASN.

Moreover, as shown in slide 23, PASN may involve signaling between the access point (authenticator) and the station (supplicant). An IEEE 802.11be access point and a station may use the MLD MAC address to derive the PMF key. The station may negotiate in a PASN negotiation the MAC address or multiple MAC addresses, which the station may use in data exchange with the access point.

Furthermore, PASN may be used with an AP MLD and a non-AP MLD station. In some embodiments, the PASN authentication establishes a key that may be used with the same access point to which the station has authenticated. In these embodiments, the pre associated station may use PASN authentication with minimum modifications The PASN authentication may be modified for IEEE 802.11be-compatible stations. Notably, an IEEE 802.11be-compatible station may use the same MAC address and key from PASN during communication with any access point in an AP MLD. Alternatively, in some embodiments, an IEEE 802.11be-compatible station may add a link-specific MAC address for each link with PASN. These embodiments may make it harder to follow the station. In a given link, the same PASN key with the assigned MAC address may be used.

Note that IEEE 802.11be-compatible stations may use the MLD MAC address in authentication instead of a link-specific MAC address. Moreover, even if PASN allows secure frame exchange over multiple links, a response may be signaled in the same link where a request was received.

Figure 12:
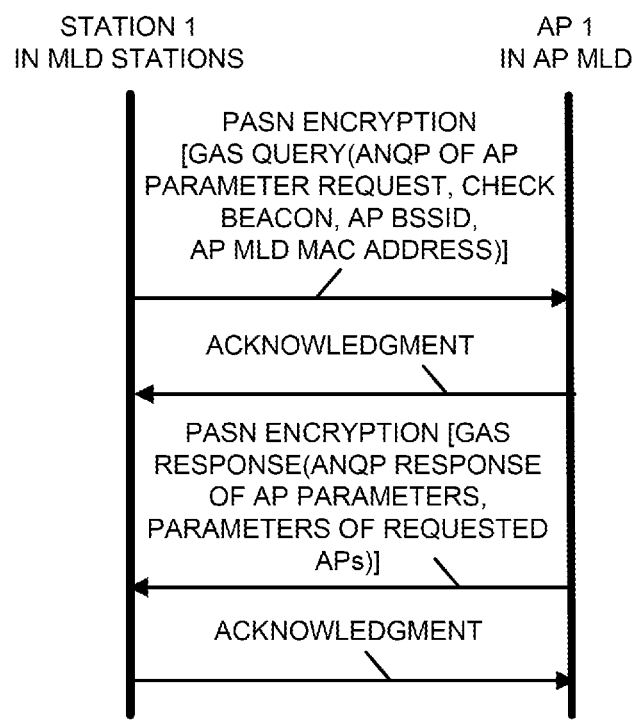
FIG. 12 is a drawing illustrating an example of communication between electronic devices of FIG. 2.

FIG. 12 presents a drawing illustrating an example of communication between electronic devices of FIG. 2. Notably, FIG. 12 shows signaling alternatives in MLD query and MLD response. In some embodiments, a GAS request and a GAS response may be reused and may include new request and response types in these frames. Alternatively, in some embodiments, MLD query and MLD response frames that are dedicated for secure signaling of the access-point parameters may be used. Note that both of the frames may be a protected dual of public action frames.

In some embodiments, the access-point identification in an MLD query may include an AP MLD MAC address, and the information of the access point in the MLD response may include parameters of all access points, except the access point receiving the request in the AP MLD. Alternatively or additionally, the access-point identification in an MLD query may include a BSSID, and the information of the access point in the MLD response may include the link-specific parameters of the requested access point. In general, the MLD query may be considered as a mechanism to query access-point parameters in an AP MLD securely or to query AP MLD parameters securely. In the present discussion, 'secure' means that the query parameters are encrypted and only known by the access point and the requesting station. Similarly, the response is only known by the access point and the station. Moreover, the access-point identification in an MLD query may include an exclusion list of BSSIDs, and the information of the access point in the MLD response may not include parameters of the access point having the BSSID included in the exclusion list. Furthermore, the access-point identification in an MLD query may include a check beacon, a BSSID and/or a link identifier, and the information of the access point in the MLD response may include link-specific parameters of the access point for which the check-beacon value is different from the requested check-beacon value.

Figure 13:
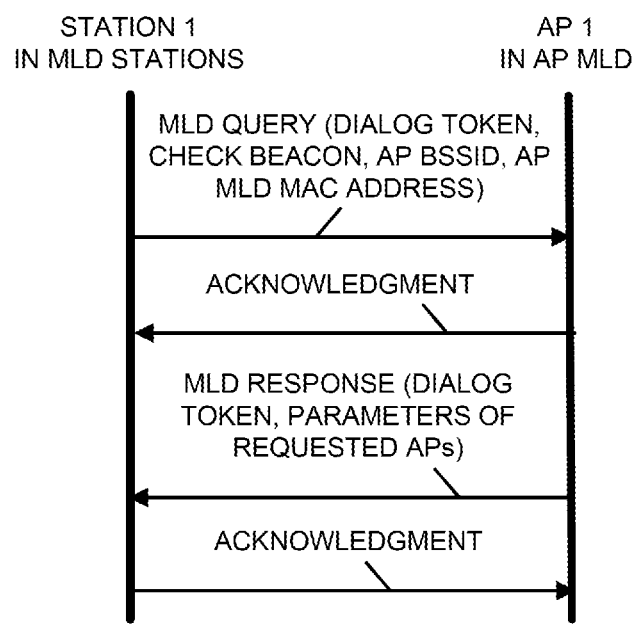
FIG. 13 is a drawing illustrating an example of communication between electronic devices of FIG. 2.

Moreover, as shown in FIG. 13, which presents a drawing illustrating an example of communication between electronic devices of FIG. 2, the MLD query response may include different information types. For example, link-specific parameters of the requested access points may be included in the MLD query response, such as all the link-specific parameters. Moreover, the access-point traffic load/delay performance may be optionally included in the MLD query response. An access point may include these parameters, or they may be obtained by a non-AP MLD using link-specific beacons and/or probe responses. Furthermore, the SSID, MLD common, security, and the MLD MAC address may not be included in the MLD query response. Instead, these parameters may be obtained in beacons and/or probe responses. Thus, there is no need to duplicate them in an MLD query response. Similarly, the TSF and the TBTT offset may not be included in the MLD query response. Instead, these parameters may be obtained in beacons and/or probe responses. Note that the TBTT offsets may be present in the RNRs.

Figure 14:
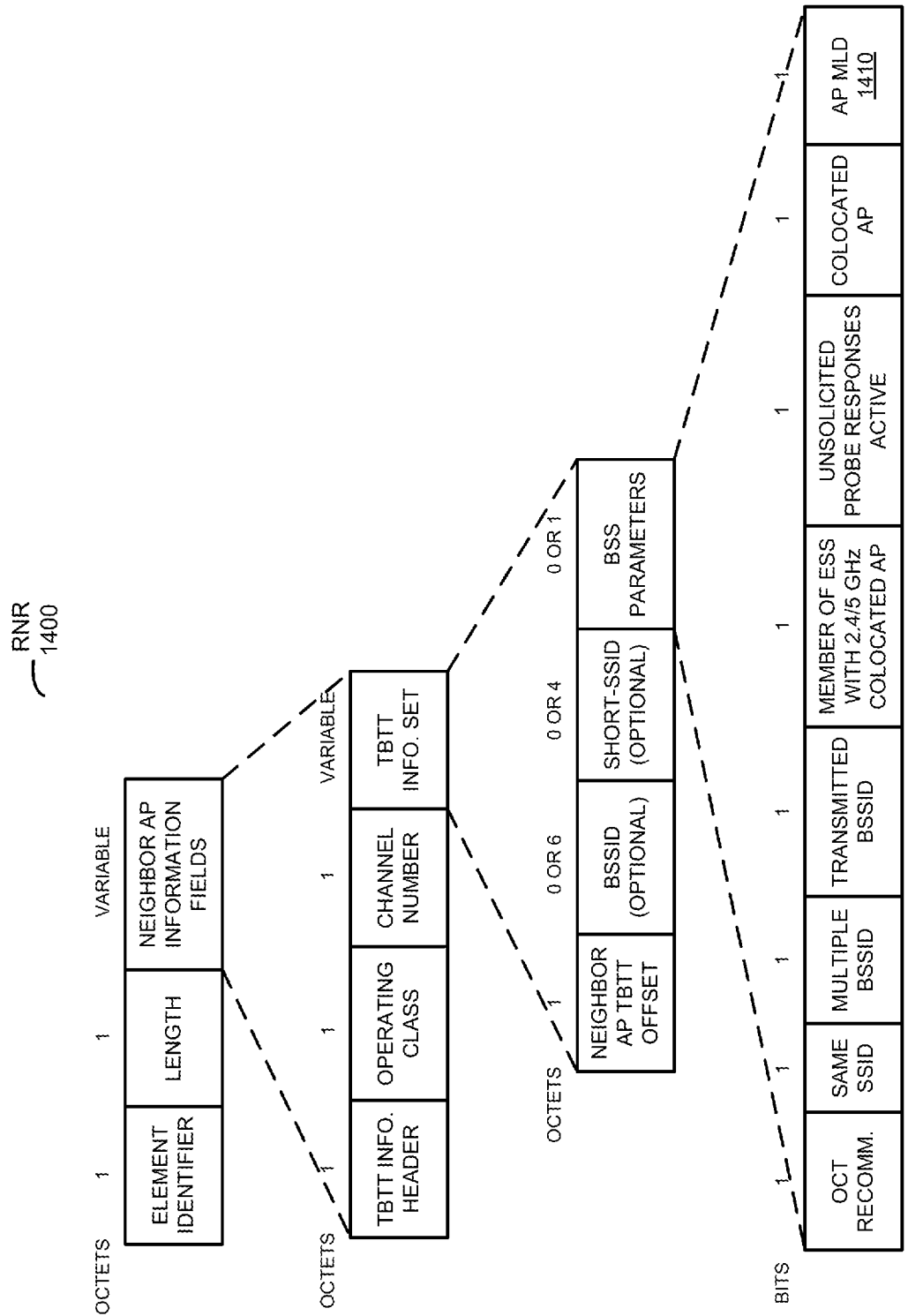
FIG. 14 is a drawing illustrating an example of a reduced neighbor report (RNR) communicated between electronic devices of FIG. 2.

Furthermore, FIG. 14 presents a drawing illustrating an example of an RNR 1400 communicated between electronic devices of FIG. 2. Notably, in the BSS parameters subfield format, a bit (such as bit 7) may be used to indicate an AP MLD 1410.

In summary, in the communication techniques AP MLD discovery may be based at least in part on the RNR and/or link-specific discovery. There may be minimum changes to existing fields and, thus, good legacy support. The RNR may enable a scanning station to detect all the access points in an AP MLD. Moreover, authentication and MLD setup (association) may be started while scanning in other links is ongoing.

In some embodiments, the MLD query may be used to collect parameters of access points before the MLD setup. This may involve a protocol dedicated for IEEE 802.11be-compatible stations.

Furthermore, the disclosed MAC address techniques may reduce the size of the AP MLD beacons. Note that the MLD MAC address may be derived from the BSSID.

Additionally, each access point may transmit beacons. A beacon and an RNR may be used to maintain the link with the access point. In some embodiments, a check beacon may indicate whether a parameter associated with a link has changed.

Some or all of these capabilities in the communication techniques may enable the use of an AP MLD, which may improve the efficiency of spectrum usage and/or the communication performance when communicating in a WLAN.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 60 GHz frequency band, a Citizens Broadband Radio Service (CBRS) frequency band, a band of frequencies used by LTE, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 15 presents a block diagram of an electronic device 1500 (which may be a cellular telephone, a smartwatch, an access point, a wireless speaker, an IoT device, another electronic device, etc.) in accordance with some embodiments. This electronic device includes processing subsystem 1510, memory subsystem 1512 and networking subsystem 1514. Processing subsystem 1510 includes one or more devices configured to perform computational operations. For example, processing subsystem 1510 can include one or more microprocessors, application-specific integrated circuits (ASICs), microcontrollers, graphics processing units (GPUs), programmable-logic devices, and/or one or more digital signal processors (DSPs).

Memory subsystem 1512 includes one or more devices for storing data and/or instructions for processing subsystem 1510, and/or networking subsystem 1514. For example, memory subsystem 1512 can include dynamic random access memory (DRAM), static random access memory (SRAM), a read-only memory (ROM), flash memory, and/or other types of memory. In some embodiments, instructions for processing subsystem 1510 in memory subsystem 1512 include: program instructions or sets of instructions (such as program instructions 1522 or operating system 1524), which may be executed by processing subsystem 1510. For example, a ROM can store programs, utilities or processes to be executed in a non-volatile manner, and DRAM can provide volatile data storage, and may store instructions related to the operation of electronic device 1500. Note that the one or more computer programs may constitute a computer-program mechanism, a computer-readable storage medium or software. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510. In some embodiments, the one or more computer programs are distributed over a network-coupled computer system so that the one or more computer programs are stored and executed in a distributed manner.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing subsystem 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations), such as: control logic 1516, one or more interface circuits 1518 and a set of antennas 1520 (or antenna elements) in an adaptive array that can be selectively turned on and/or off by control logic 1516 to create a variety of optional antenna patterns or 'beam patterns.' Alternatively, instead of the set of antennas, in some embodiments electronic device 1500 includes one or more nodes 1508, e.g., a pad or a connector, which can be coupled to the set of antennas 1520. Thus, electronic device 1500 may or may not include the set of antennas 1520. For example, networking subsystem 1514 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 1514 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or frame frames and/or scanning for advertising frames transmitted by other electronic devices.

Within electronic device 1500, processing subsystem 1510, memory subsystem 1512 and networking subsystem 1514 are coupled together using bus 1528 that facilitates data transfer between these components. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/ or electro-optical connections among the subsystems.

In some embodiments, electronic device 1500 includes a display subsystem 1526 for displaying information on a display, which may include a display driver and the display, such as a liquid-crystal display, a multi-touch touchscreen, etc. Display subsystem 1526 may be controlled by processing subsystem 1510 to display information to a user (e.g., information relating to incoming, outgoing, or an active communication session).

Electronic device 1500 can also include a user-input subsystem 1530 that allows a user of the electronic device 1500 to interact with electronic device 1500. For example, user-input subsystem 1530 can take a variety of forms, such as: a button, keypad, dial, touch screen, audio input interface, visual/image capture input interface, input in the form of sensor data, etc.

Electronic device 1500 can be (or can be included in) any electronic device with at least one network interface. For example, electronic device 1500 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems. Additionally, one or more of the subsystems may not be present in electronic device 1500. Moreover, in some embodiments, electronic device 1500 may include one or more additional subsystems that are not shown in FIG. 15. In some embodiments, electronic device may include an analysis subsystem that performs at least some of the operations in the communication techniques. Also, although separate subsystems are shown in FIG. 15, in some embodiments some or all of a given subsystem or component can be integrated into one or more of the other subsystems or component(s) in electronic device 1500. For example, in some embodiments program instructions 1522 are included in operating system 1524 and/or control logic 1516 is included in the one or more interface circuits 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1514. This integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/ or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1522, operating system 1524 (such as a driver for an interface circuit in networking subsystem 1514) or in firmware in an interface circuit networking subsystem 1514. Alternatively or additionally, at least some of the operations in the communication techniques may be implemented in a physical layer, such as hardware in an interface circuit in networking subsystem 1514. In some embodiments, the communication techniques are implemented, at least in part, in a MAC layer and/or in a physical layer in an interface circuit in networking subsystem 1514.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the communication techniques electromagnetic signals in one or more different frequency bands are used. For example, these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna node configured to communicatively couple to an antenna; and
one or more interface circuits communicatively coupled to the antenna node, wherein the one or more interface circuits are configured to:
transmit, to the antenna node, beacons associated with multiple access points, cohosted by the electronic device, that provide concurrent links in different bands of frequencies, wherein the electronic device comprises an access-point multi-link device (AP MLD),
wherein the beacons comprise: a first service set identifier (SSID) associated with the access points in the AP MLD, and a first MLD media access control (MAC) address associated with the access points in the AP MLD, and
wherein a given beacon is associated with a given access point and comprises: information specifying a channel of a given link, a reduced neighbor report (RNR) providing information about at least the access points in the AP MLD, and a field that indicates when the given access point is included in the AP MLD.

2. The electronic device of claim 1, wherein the electronic device is compatible with an Institute of Electrical and Electronics Engineers (IEEE) 802.11be standard.

3. The electronic device of claim 1, wherein the RNR comprises information about an additional access point cohosted by the electronic device that is not included in the AP MLD and that has a second SSID and a second MAC address different from the first SSID and the first MLD MAC address.

4. The electronic device of claim 1, wherein the one or more interface circuits are configured to associate with a recipient electronic device based at least in part on the information included in the given beacon.

5. The electronic device of claim 1, wherein a basic service set identifier (BSSID) in the given beacon is derived from the first MLD MAC address.

6. The electronic device of claim 1, wherein a basic service set identifier (BSSID) in the given beacon comprises the first MLD MAC address and a link-specific portion specifying a link identifier.

7. The electronic device of claim 1, wherein the field is one byte in length.

8. The electronic device of claim 1, wherein the one or more interface circuits are configured to:
transmit, to the antenna node, a pre-association security authentication negotiation (PASN) authentication request addressed to a recipient electronic device, wherein the PASN authentication request comprises the first MLD MAC address; and
receive, from the antenna node, a PASN response associated with the recipient electronic device, wherein a single link is used to communicate the PASN authentication request and the PASN response.

9. An integrated circuit, comprising:
an antenna node configured to communicatively couple to an antenna; and
a radio communicatively coupled to the antenna node, wherein the radio is configured to:
transmit, to the antenna node, beacons associated with multiple access points, cohosted by an electronic device, that provide concurrent links in different bands of frequencies, wherein the electronic device comprises an access-point multi-link device (AP MLD),
wherein the beacons comprise: a first service set identifier (SSID) associated with the access points in the AP MLD, and a first MLD media access control (MAC) address associated with the access points in the AP MLD, and
wherein a given beacon is associated with a given access point and comprises: information specifying a channel of a given link, a reduced neighbor report (RNR) providing information about at least the access points in the AP MLD, and a field that indicates when the given access point is included in the AP MLD.

10. The integrated circuit of claim 9, wherein the integrated circuit is compatible with an Institute of Electrical and Electronics Engineers (IEEE) 802.11be standard.

11. The integrated circuit of claim 9, wherein the RNR comprises information about an additional access point cohosted by the electronic device that is not included in the AP MLD and has a second SSID and a second MAC address different from the first SSID and the first MLD MAC address.

12. The integrated circuit of claim 9, wherein the integrated circuit is configured to associate with a recipient electronic device based at least in part on the information included in the given beacon.

13. The integrated circuit of claim 9, wherein a basic service set identifier (BSSID) in the given beacon is derived from the first MLD MAC address.

14. The integrated circuit of claim 9, wherein a basic service set identifier (BSSID) in the given beacon comprises the first MLD MAC address and a link-specific portion specifying a link identifier.

15. The integrated circuit of claim 9, wherein the integrated circuit is configured to:
transmit, to the antenna node, a pre-association security authentication negotiation (PASN) authentication request addressed to a recipient electronic device, wherein the PASN authentication request comprises the first MLD MAC address; and
receive, from the antenna node, a PASN response associated with the recipient electronic device, wherein a single link is used to communicate the PASN authentication request and the PASN response.

16. A recipient electronic device, comprising:
an antenna node configured to communicatively couple to an antenna; and
one or more interface circuits, communicatively coupled to the antenna node, configured to communicate with an electronic device, wherein the one or more interface circuits are configured to:
receive, from the antenna node, beacons associated with multiple access points, cohosted by the electronic device, that provide concurrent links in different bands of frequencies, wherein the electronic device comprises an access-point multi-link device (AP MLD),
wherein the beacons comprise: a first service set identifier (SSID) associated with the access points in the AP MLD, and a first MLD media access control (MAC) address associated with the access points in the AP MLD, and
wherein a given beacon is associated with a given access point and comprises: information specifying a channel of a given link, a reduced neighbor report (RNR) providing information about at least the access points in the AP MLD, and a field that indicates when the given access point is included in the AP MLD.

17. The recipient electronic device of claim 16, wherein the one or more interface circuits are configured to associate with the electronic device based at least in part on the information included in the given beacon before all of the beacons are received.

18. The recipient electronic device of claim 16, wherein the electronic device is compatible with an Institute of Electrical and Electronics Engineers (IEEE) 802.11be standard.

19. The recipient electronic device of claim 16, wherein a basic service set identifier (BSSID) in the given beacon is derived from the first MLD MAC address.

20. The recipient electronic device of claim 16, wherein a basic service set identifier (BSSID) in the given beacon comprises the first MLD MAC address and a link-specific portion specifying a link identifier.

* * * * *